FIG. 2-A

INVENTOR.
Donald F. Othmer

May 10, 1966 D. F. OTHMER 3,250,081
PROCESS FOR FREEZING WATER FROM SOLUTIONS TO
MAKE FRESH WATER OR CONCENTRATED SOLUTIONS
Filed Dec. 26, 1962 4 Sheets-Sheet 2
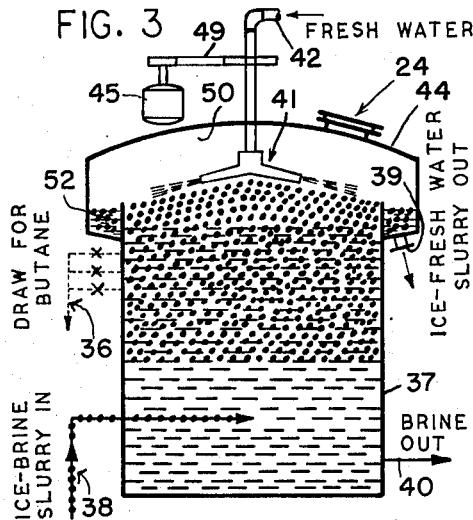
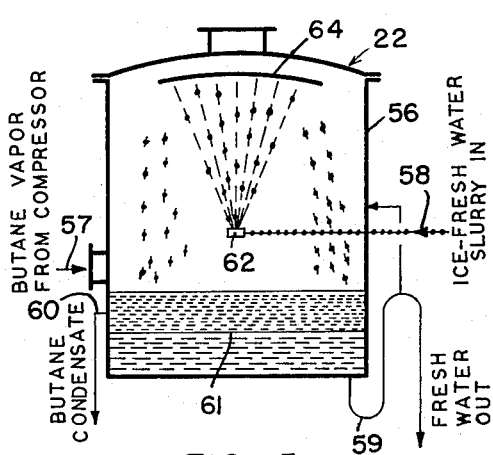
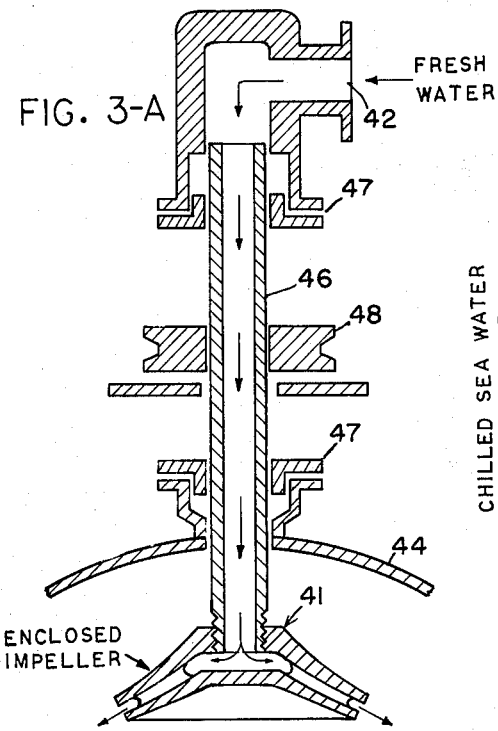
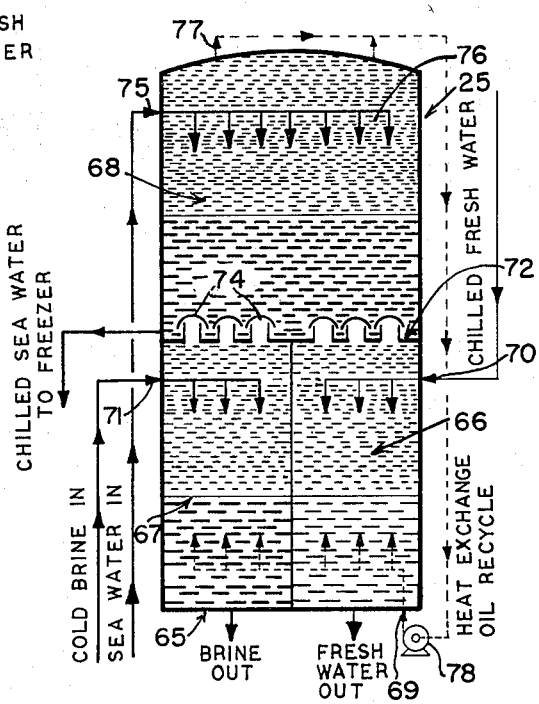
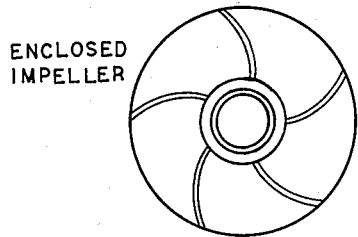
Donald F. Othmer
INVENTOR.

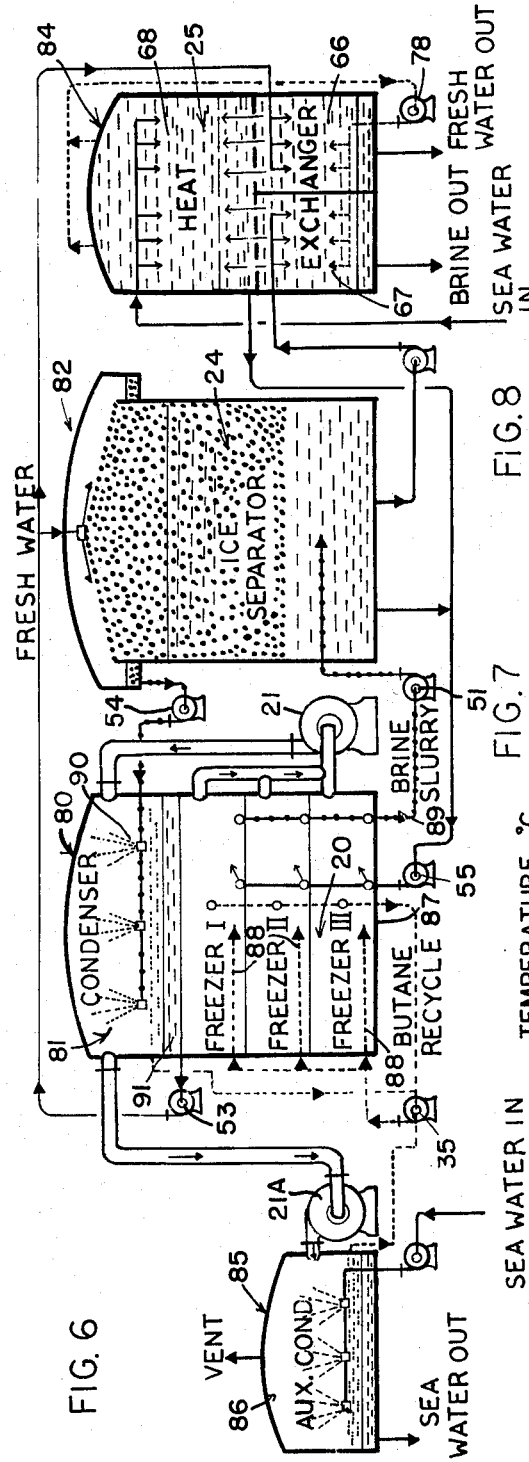
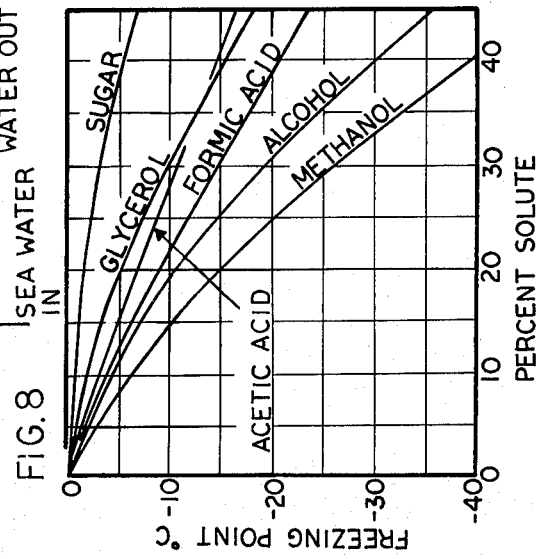
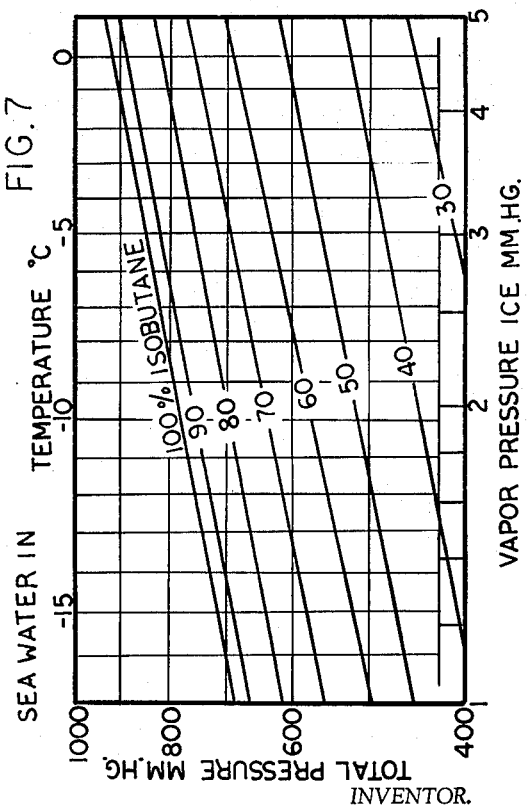
FIG. 6
FIG. 7
FIG. 8

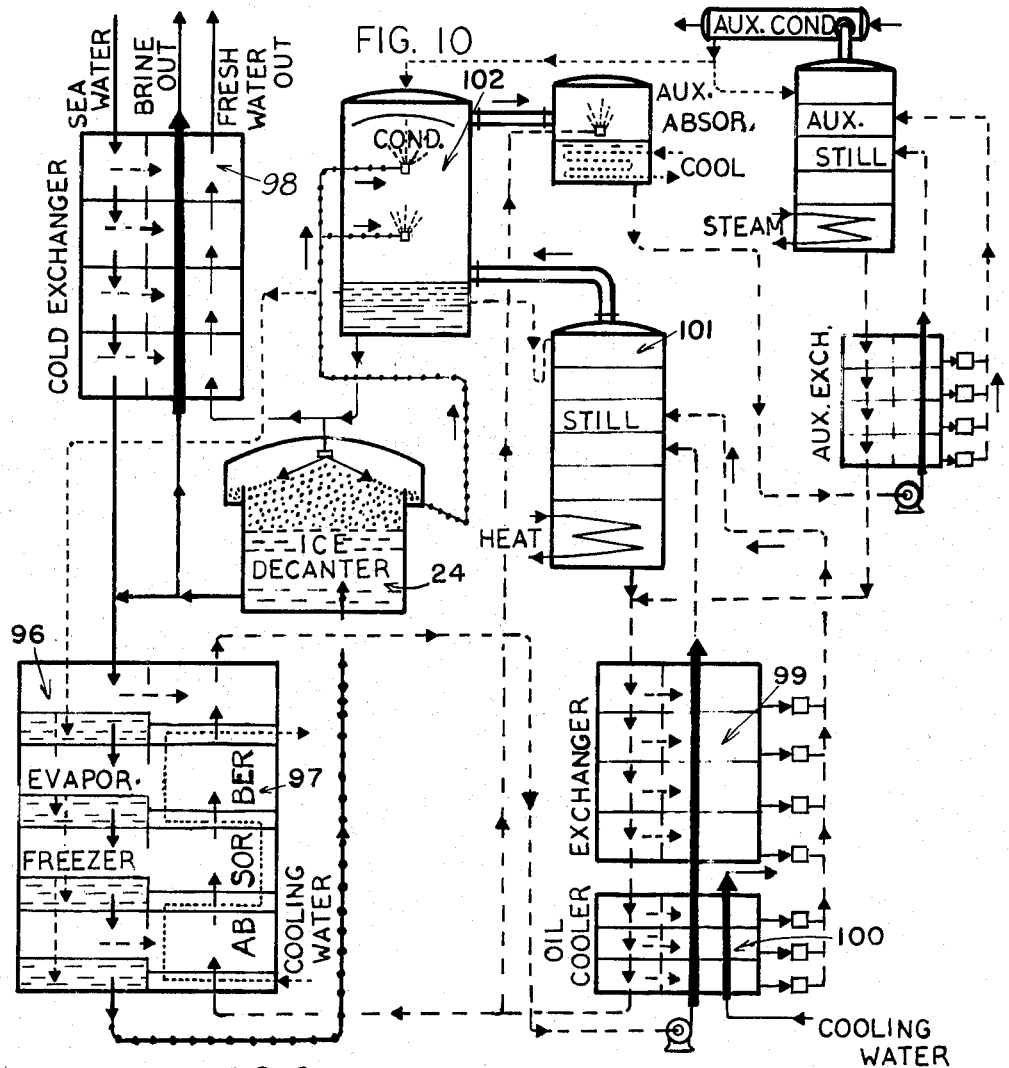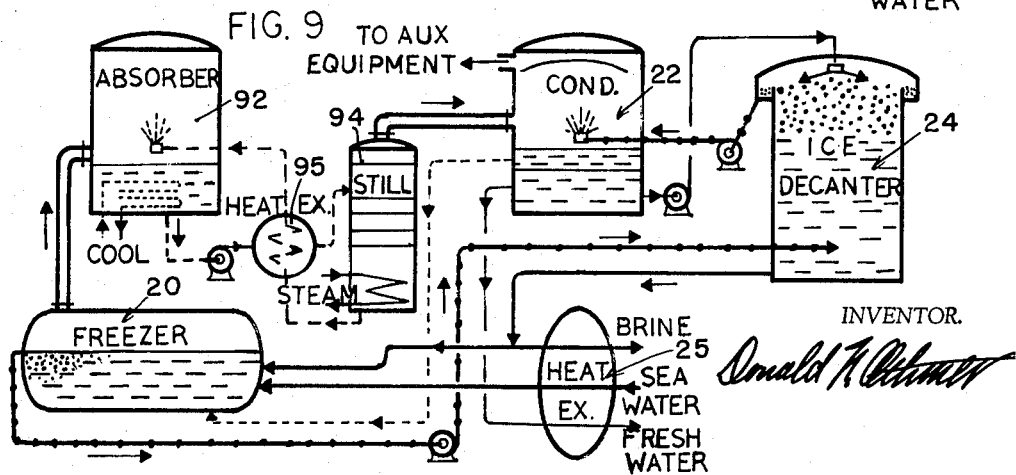

United States Patent Office 3,250,081
Patented May 10, 1966

3,250,081
PROCESS FOR FREEZING WATER FROM SOLUTIONS TO MAKE FRESH WATER OR CONCENTRATED SOLUTIONS
Donald F. Othmer, Coudersport, Pa.
(333 Jay St., Brooklyn 1, N.Y.)
Filed Dec. 26, 1962, Ser. No. 247,207
16 Claims. (Cl. 62—58)

The process of this invention crystallizes solvent from a solution, separates the crystals, and melts the crystals in such a way that the latent heat required for their melting is supplied by using the latent heat of their freezing from the original solution through the utilization of a refrigerant fluid insoluble in the solvent. No metallic heat transfer surface is used; and direct contact with the refrigerant is maintained in both the freezing and the melting steps. Substantially pure solvent may be recovered. Normally, the solvent is water; and the greatest utilization of the process will be in the removal of fresh water from saline waters, either natural sea water, or brackish water. However, water may be separated from solutions occurring in chemical and related industries, such as sugar liquors, sulfite pulping liquors, fermentation beers—either for potable or other use—and other industrial liquors containing water soluble liquids or solids from which ice crystallizes on cooling. Also, other solvents may be separated from solutions—sometimes from aqueous solution, by using the principles of this invention as explained hereinafter.

While water is the usual solvent separated in this process, any others which have suitable freezing properties under appropriate operating conditions may be separated from their solutions. Water will be used as an example to represent or express the utilization of many other solvents in this process. Also, many aqueous solutions may be concentrated while recovering the water therefrom, including those containing solids, e.g., salt, sugar, naturally occurring mixtures of solids in sea water, brackish waters, etc., and liquids, e.g., alcohol—as brewers or distillers beer, acetic acid and formic acid in those dilute concentration ranges where water freezes out as pure ice, glycerol, sulfuric acid, etc. In many cases, the peculiar advantages indicated above for freezing processes of dewatering, will be of major interest, also another one of lack of decomposition of heat sensitive materials. In sugar refining, for example, the low-temperature of freezing eliminates the inversion or carmelization which may occur in boiling operations.

However, sea water will usually be considered hereinafter as an example; and the concentrate—that obtained by removing what may often be approximately an equal volume of fresh (or "sweet") water will be called "brine." Raw sea water may be considered as approximately 3,500 parts per million (3.5%) total solids—most of which is common salt; the brine concentrate would thus be 7,000 parts per million (7.07%) approximately; and the potable or "fresh" water recovered is usually specified as being below 500 parts per million (p.p.m.), and may be produced in even lower concentration, if desired.

In these freezing operations, there is the usual depression of the freezing point of ice from solutions; and in the case of sea water wherein half of the water is frozen out, the temperature maintained in a continuous freezer must obviously be that of ice in equilibrium with the brine removed, which is, of course, lower than that of ice in equilibrium with the sea water feed.

Whereas many suitable refrigerants which would be insoluble in the aqueous liquids involved are known to the art, the hydrocarbons containing four carbon atoms and either saturated or unsaturated, will be used as an example. This may be normal butane, isobutane, or such mixtures as may be commercially available—preferably, but not necessarily, of a greater percentage of isobutane, and with only such smaller amounts of propane, pentanes, or other homologous hydrocarbons, which may come in commercially available material. Butane and isobutane, and their mixtures, have vapor pressures somewhat, but not greatly, above that of normal atmospheric pressure at the freezing point of most aqueous solutions which are encountered. This has some important and practical advantages. Also, they are cheap and readily available.

Sometimes the butenes may be cheaper, either singly, mixed with each other, or with butane and/or isobutane. The general range of normal boiling points of the refrigerant mixtures will thus be from about $-0.5°$ C. for the normal butane to about $-11.5°$ for the isobutane. It is desirable, but not necessary, to use liquids which exert slightly more than 1 atmosphere vapor pressure in the temperature of the freezing of water.

Other materials, chemically stable under the operating conditions in this boiling range, may also be used when water is to be frozen out of its solution by this process. In some special cases as indicated hereinafter, where the process is used for dewatering solutions of organic liquids, lower temperatures are required—and these may be obtained in practice either by using the butane type under sub-atmospheric pressures, or by using propane or propane mixtures with the butanes, various of the chlorinated or chloro fluorinated solvents, methyl ether, and other materials of similar boiling ranges down to $-40$ to $-45°$ C. These materials have disadvantages because of the high pressures which result if a vessel containing some quantity is allowed to come to normal atmospheric temperature. Also, there are disadvantages of hydrate formation with water in the case of propane and some of the others, as well as undue solubility in water under the required pressures. Nevertheless, they may be used within their limitations, especially when the lower freezing temperature range is desired. Any desired boiling temperature may be obtained in this range by mixtures of the several liquids.

When the term "butane" is used hereinafter, it may be regarded generally as the refrigerant fluid, pure or mixture; if a specific refrigerant is intended, it will be referred to as "normal-butane" or "isobutane", etc. Other refrigerants than the $C_4$ hydrocarbons will also be referred to specifically for particular usages.

While a centrifugal separator may be used for separation of ice crystals formed in this process, it has been found to be of greater initial cost and greater operating cost, except for relatively small plants, than the improved form of ice-brine decanter which is described hereinafter. Pumps and compressors are the other mechanical devices associated with refrigeration plants.

Usually three major items of heat transfer equipment are essential in a freezing plant which liquifies by compression a direct contact refrigerant: the freezer, the condenser, and the heat exchanger (or exchangers). Various liquid-liquid-liquid heat exchangers have been used in freezing and other water desalination processes as will be discussed hereinafter. The co-pending application No. 241,721, of December 3, 1962, entitled Method for Cooling Volatile Liquids describes an advantageous heat exchanger for cooling the feed sea water while bringing up to ambient temperature the effluent fresh water and concentrate. This operates by a flash evaporation which gives an 8 to 10% increase in product without additional equipment or energy cost.

Furthermore, absorption systems have also been described in freezing processes; and an absorber has been substituted for the condenser as the ice melter, while a distilling column is used instead of the vapor compressor. The advantages of the present invention may be used in such flow arrangements. However, by the use of the modified absorption process described hereinafter in which the ice melter is the condenser for the vapors from the still, a much lower overall range of temperatures is achieved with a corresponding decrease in refrigeration requirements, and lowering of operating cost. When the method for Cooling Volatile Liquids of application No. 241,721, is utilized for the several heat exchangers required, a much lower heat requirement is achieved for reasons which will be discussed, since this method incorporates the functions of heat exchanger, evaporator, and condenser, as might be expected; but in this particular usage also that of gas absorber and rectifying column.

OBJECTS OF THE INVENTION

The major object of this invention is to separate a solvent, usually water, from a solution by freezing, to take advantage of the features mentioned above in an economical manner, minimizing both energy costs and equipment costs.

Another object is to operate a water desalination plant without metallic heat transfer surfaces, in order to minimize equipment cost and to eliminate the resistance to heat transfer of fluid films adjacent the usual metallic surfaces when heat is being transferred.

Another object is to separate solvent by freezing it from a solution wherein the freezer, the condenser, the heat exchanger, and the ice separator are each substantially simple drums or vessels without moving parts or "internals," or with only a minimum of moving parts or internals such as usual pipe and fittings, spray heads, etc. The equipment cost is thus minimized—largely being reduced to that of empty drums—with external pumps, compressors, and fluid handling equipment. Furthermore, this same simplicity of equipment accomplishes simultaneously a simplicity of operation—hence ready automation—and simplicity and economy of maintenance.

Yet another object is to operate a continuous freezer for ice crystals from aqueous solutions at an optimum rate throughout its entire volume and the entire freezing cycle without producing new and small seed crystals during the later stages of the freezing.

A further object is this optimization of production through the use of a vapor pressure depressant liquid, which in the specially designed and operated freezer, allows a controllable range of temperature differences between the same evaporating refrigerant and the ice crystals being formed even though the freezing point is being continually lowered. This temperature difference may thus be maintained always at the maximum which may be used without endangering the formation of undesired new seed crystals in some parts of the freezer while operating satisfactorily elsewhere.

In another embodiment, an object is to operate through changing the pressure to secure a controllable range of temperature between the same evaporating refrigerant and the ice crystal as the freezing point is being lowered.

Another object is the utilization of a new Method for Cooling Volatile Liquids of U.S. patent application No. 241,721, of December 3, 1962, so as to secure a substantial increase in the amount of fresh water produced without additional energy cost.

One more object is to uilize absorption refrigeration as a means of producing the refrigeration effect wherein a refrigerant is used to freeze ice crystals by direct contact with the solution, the refrigerant is absorbed in an absorbing oil and is then stripped in a still from the absorbing oil as vapors which are condensed to melt the ice crystals by direct contact, while the advantages of the new Method for Cooling Volatile Liquids are secured for heat transfer, gas absorption and rectification in the several component parts of the absorption system.

Another object is the separation of water economically from many aqueous solutions in the process industries, including solutions of solids as salt, sugar, salts of sodium, or other alkali materials and organic residues from wood pulping operations; also aqueous solutions of alcohol, methanol, glycerol, acetic acid, formic acid, and other materials.

Still other objects and the methods used for their realization will be apparent form a consideration of the description hereinafter.

OUTLINE OF PRESENT PROCESS

The foregoing objects are generally accomplished by a system including the components about to be described.

The freezer is a vessel in which sea water is contacted with liquid butane as a refrigerant, at a temperature somewhat below 0° C, the usual freezing point of water, due to the depression of the freezing point of water from a solution. The butane evaporates; and its vapor passes to the suction of a compressor as in the usual refrigerant system. The latent heat of evaporation which the butane requires is supplied by the water phase, which cools with the formation of ice crystals. Thus the latent heat given up in freezing water, passes off in the vaporization of butane.

A slurry of ice crystals and brine is passed to an ice separator, the large crystals formed may be separated in a batch or continuous centrifuge—particularly if the plant capacity is less than about 2,000 gallons per hour. This has other disadvantages and an ice-decanter is preferred to separate by gravity action ice from brine. The separated crystals of pure ice are picked up as a new slurry with a stream of fresh water maintained exactly at the freezing point; and this slurry is passed to a spray condenser.

In the spray condenser, the fresh water-ice slurry contacts directly the vapors discharged from the freezer and compressed by the compressor. The condenser operates as usual in a refrigeration cycle, condensing the butane vapors to a liquid at a somewhat higher pressure than that of the freezer.

The fresh water-ice slurry remains substantially isothermal, i.e., at 0° C., but the ice crystals are melted; and there is formed liquid water, along with liquid butane condensate. The liquid butane is separated by gravity from the water, and is passed back to the freezer for recycle, as is normal in a closed circuit refrigerating system. The fresh water separated is that originally in the slurry in addition to that formed by the melting of the solid crystals. This is withdrawn and then separated into two streams, one being used again to form the slurry with successive ice crystals; the other is passed out of the system as product fresh water.

A part of the cold brine from the ice decanter is discharged from the system. Both this stream and the cold fresh water are used in a heat-interchange relationship with the raw sea water coming into the system in an amount which is equal to these two streams of effluent. The cooling of the entering sea water raises the temperature of the fresh water and the brine correspondingly. A direct contact heat exchanger using no metallic surface, of the liquid-liquid-liquid type may be used.

Because of mechanical, thermal and other loses, there is insufficient cooling effect in the spray condenser from the melting of ice from the fresh water-ice slurry, to condense all of the vapors of butane leaving the freezer; and an auxiliary condensing system, operated at a higher pressure, must be utilized. Again, the condensate butane fluid is re-cycled back to the freezer.

The absorption system of refrigeration has been found advantageous for freezing ice to dewater solutions when it is preferred to use heat rather than power. The butane vapors from the freezer are absorbed in a suitable adsorbent oil, a still separates the butane therefrom; and butane vapors are condensed in a spray condenser by the ice slurry coming from the ice-decanter as described above. In the absorption system, particularly, heat may advantageously be exchanged as mentioned above and as described in the copending U.S. application No. 241,721.

The increase of the degree of agitation in the freezer tends to increase the rate of mass transfer, and therefore the rate of heat transfer, with a corresponding reduction in the temperature differential necessary to cause freezing to take place at the desired rate. Furthermore, the agitation, therefore, also prevents the buildup of an undesirably high temperature differential—if heat were removed unduly fast as to cause the formation of fresh crystals in such large numbers they would never have the opportunity to grow to the size necessary for satisfactory separation later.

These several factors and some other controlling the freezing of ice from brines, are difficult to evaluate quantitatively. Suffice it is, however, to indicate below the application of the principles involved in the description of the design and operation of the process and equipment which has been found to accomplish this freezing of relatively large crystals in a reasonable length of time, so that the throughput or capacity of the freezer is large and its total volume, for a given production, is small.

However, it may be emphasized that it is necessary for the individual ice crystals to have contact with sufficient brine moving near and around their surfaces so they will grow rapidly.

Adequate agitation, is, of course, desirable, but too much agitation may be undesirable. There is thus an optimum amount of agitation which may be used because of its adverse effects: (a) interference in the growth of crystals or their breakup; (b) increasing power costs with increased agitation; and (c) increased heat generated mechanically by increasing amounts of agitation—particularly where mechanical agitators are used—which heat must be removed by the refrigerating action of the thermodynamic fluid. It has been found that the relatively mild, but none-the-less efficient system of agitation which has now ben devised as an important part of this invention, is very satisfactory for this purpose, and it eliminates entirely internal mechanical agitators, propellers, scrapers, blades, etc.

The freezing point of ice from water or any aqueous solution may be regarded as entirely unaffected by any pressure encountered in the present processing.

CONTROL OF BOILING TEMPERATURE OF REFRIGERANT DURING FREEZING

Another aspect of crystal growth has been realized to exist, but has never been thoroughly understood, nor provided for in any of the prior crystallizing systems utilizing direct contact refrigerants. The amount of super-cooling of the bulk of the solution which may be utilized satisfactorily to obtain the maximum rate of crystal growth (and still not cause formation of new crystals) varies with the increasing concentration of the brine as pure water is crystallized out of the solution. Hence, in those systems wherein there is a growth of original crystals without formation of new ones, the maximum super-cooling of the bulk solution which may be tolerated without formation of new and undersired small crystals will be dependent upon the size which the crystals have attained at a particular stage of their development, since the size is, under these circumstances, inversely proportional to the concentration.

This super-ooling may best be considered first with regard to a batch crystallization, wherein the same number of crystals are growing without formation of new seeds. Here, if sea water started to freeze at —2° C. and a super-cooling of 0.5° C. was desired, the refrigeration should be supplied at such a rate to keep the bulk of the liquid at —2.5° C. As crystallization proceeds to a 2-for-1 concentration of the brine, the freezing point is then —4.3° C. and the bulk liquid temperature might be —4.8° C. If this same temperature difference could be maintained through the process, the maximum rate at all times under the varying conditions would be obtained. This would not be a constant rate because increasing the size of the crystal means increasing the area for the same number, hence increasing rate of growth in pounds per unit time. Hence, the amount of refrigeration, i.e., heat quantity per hour, would have to change accordingly.

In the usual continuous crystallizer of a single agitated tank, the concentration of the brine discharged is necessarily that of the bulk of the liquid; thus, in this case, the temperature would always be —4.3° C. for the ice forming, and —4.8° C. for the bulk of the liquid. The freezer is thus always working at the least efficient conditions; i.e., the lowest possible temperature.

One of the essential features of the present invention is a simple and readily operated method of varying and controlling in a single vessel, continuously operated, freezer, the optimum degree of super-cooling of the brine in relation to the concentration of the solution and the size of the crystals during their period of growth.

Crystals are thus forming at the highest possible temperature (i.e., least depression of the freezing point) as the solution becomes progressively more concentrated, as in a batch operation—with, however, the obvious advantages of a continuous operation.

This control of the supercooling of the solution at the different stages of a continuous freezing operation, operating at a constant pressure and using a direct contact refrigerant, is readily accomplished by the addition, during the earlier stages, of a small amount of a higher boiling liquid miscible with the liquid refrigerant, but not miscible with water. This liquid, desirably, has a boiling point sufficiently high, and thus a vapor pressure sufficiently low, so that at the freezing point of ice from the solution, it will have a vapor pressure of not over about 4 or 5 millimeters of mercury. By controlling the amount of this liquid added to the refrigerant or to the freezer where it will contact and go into solution with the refrigerant, the effective boiling point of its admixture with the refrigerant may be increased. Such an increase of the effective boiling point of the refrigerant will (at the same pressure) reduce the temperature difference overall from the boiling refrigerant to the bulk of the freezing liquid—thence to the ice crystals actually being formed. In any case, this temperature at the freezing interface is fixed by the concentration of liquid at the interface.

Preferably liquids to be used are petroleum hydrocarbons or their mixtures as naphthas with boiling ranges from about 110° to 175° C., also aromatics as toluene, xylenes, chlorinated hydrocarbons, etc.

For example, a mixture of 10% of commercial grade pure octane added to 90% of a commercial grade of isobutane, under a pressure of 850 mm. of mercury, boiled at about —3° C., while a mixture of 18% of the same octane and 82% of the same isobutane boiled at 0° C. under the same pressure, compared to —5° C. for the commercially pure isobutane alone. Thus, by controlling the amount of octane present from 0% to 18%, the range of the effective boiling point of this refrigerant at 850 mm. of pressure may thus be controlled as desired between 0° C. and —5° C. 850 mm. was selected as a pressure which is slightly above atmospheric, as is usually preferred.

Hence, if a freezer for sea water operates at slightly over one atmosphere pressure, 850 mm. of mercury, the temperature of the boiling of the refrigerant, isobutane, when the first ice is formed (—2° C.) will be, say, —0.5° C. lower or —2.5° C.; and this might contain about 7% octane, while after a concentration of two for one (freezing point —4.3° C.), it should be about —5° C. and contain no octane.

These figures do not include the practical but necessary temperature differences for driving heat from the brine to the colder liquid isobutane which is evaporating; nor do they include the minor inefficiency and temperature loss due to the average hydrostatic pressure of the brine. If this necessary, and for the present purpose—optimum, temperature differential is taken as an average of 2° C. in another example where the boiling pressure was 800 mm. of mercury, the corresponding temperatures of evaporating refrigerant was for the initial sea water, −5.5% utilizing 12% octane. After a two-to-one concentration it was −9.5° C. when there was merely the isobutane alone.

These examples are taken, using commercial grades of isobutane and normal octane. In practical operation, each of these components would always be mixtures including the homologous hydrocarbons in slightly different amounts. Hence, the vapor pressures and boiling points will vary slightly, but the principle is the same. To secure and control the optimum rate of crystal growth as determined by the temperature difference between the evaporating refrigerant and the ice crystals freezing out of different concentrations of brine, it is possible to vary the boiling point of the refrigerant by a vapor pressure depressant liquid of a higher boiling point. This amount is maximum where crystals are first forming and then is reduced to zero where the final crystals, grown now to the desired size, are discharged from the most concentrated (lowest temperature) brine. The pressure of boiling is always assumed as fixed at atmospheric or slightly above.

Throughout the entire freezing operation, wherein there would be maintained a lessening amount of this additive, and even with a varying boiling point of the refrigerant, isobutane, the vapors arising will still be substantially pure isobutane, since the vapor pressure of the additive is so low. Any very small amount of octane which does evaporate, stays with the isobutane, through the compressor, condenser, and back to the freezer as condensate without particular notice.

To the extent desired, this addition of a vapor pressure depressing liquid reduces and maintains the capacity of crystal growth at the earlier stages of freezing so that it is at the maximum allowable rate without any production of new and excess seed crystals; and to a lesser extent, the amount of depressant liquid is reduced as the freezing proceeds (with practically zero reduction in capacity at the end). Such a control of the amount of depressant liquid present throughout the cycle prevents unwanted seed crystals being formed and thus allows always the maximum capacity at all parts of the freezing cycle of the equipment on an overall basis. In a stepwise operation of the freezer, all steps being at the same pressure, it is plain that a lessening percentage of the depressant liquid present in the butane in the successive steps would be desired—maximum at the start of the freezing operation with raw sea water, and zero at the end. A simple mechanism for ready control of this has been found—thus optimum operating throughout the entire cycle is possible.

In the liquid-liquid-liquid heat exchanger to be described, a naphtha fraction may again be used. The two liquids may be the same material. Then if a very small amount of the heat carrier liquid is carried along by the sea water being chilled, it will come directly to the freezer and show up there and be controlled in amount for its function. Similarly, if any refrigerant is carried with the brine-ice slurry, this may be returned partly from the ice decanter, or it may pass partly to the liquid-liquid-liquid heat exchanger, where it will be dissolved into the heat transfer liquid, of which it may consist in part.

This vapor pressure depressant secures the cooling of the liquid to the optimum temperature below the equilibrium freezing point at each part of a freezer through the regulation of the effective vapor pressure of the butane.

Another method of changing the boiling point of the butane—particularly in the absorption system of refrigeration—is by varying the pressure in each of a succession of stages of the evaporator-absorber as described in the copending application 241,721, of December 3, 1962. On freezing out ice to de-water the solution, the pressure and temperature of butane in successive stages becomes lower and lower. The corresponding brine temperature is somewhat higher because of the necessary temperature difference to transfer heat. The brine concentration controls its freezing point. By proper control of the rate of flow of crystals and brine (usually as a slurry) from stage to stage of next lower pressure and temperature, the concentration is established to give the optimum temperature difference for the optimum rate of heat transfer and hence crystallization. Supply of brine to an individual stage, from the ice-decanter, or from stages of lower pressure, may also be used to control the concentration. The balance of concentration and the supercooling of brine below its freezing point, secured now by pressure and boiling part of butane, secures optimum rate of crystal growth.

Similarly, such stagewise operation may be used with a compression system with one compresser across all the stages in parallel or with a compressor for each stage. With successively lower pressures for each stage, the optimum temperature differences and hence rates of heat transfer and crystal growth, may be secured. A vapor depressant liquid may also be used in the freezer—whether there is one stage or several stages of freezing at different pressures.

FIGURES

The attached figures are principally schematic diagrams of the flow of fluids and solids in the exemplary methods of operation of this invention. These illustrations show the arrangement of the equipment components, and are to be regarded merely as examples for understanding the principles of the invention, and are not to be regarded as closely limiting the type or design of equipment to be used to any particular structure or component. They only indicate some of the many arrangements which have been found to secure the advantages of the invention, and in any case show only an example of one particular design of processing or of component parts of one element of the processing equipment.

Lines for liquid flow are shown as single lines—the heavier single lines indicate flow of brine, lighter single lines represent flow of fresh water. Solid lines with dots indicate the flow of ice slurries, either fresh water or brine, depending on the thickness of the line; and dotted lines indicate the flow of liquid butane. Double lines indicate the somewhat larger pipelines usually associated with vapors—in the present invention only vapors of butane are considered (containing sometimes a small amount of vapor depressant material in vapor form, and always the very small amount of water associated with boiling an insoluble liquid in contact with water).

Valves and similar control devices are not always indicated; but they are necessary for the control of liquid flow at appropriate points, as will be recognized by those skilled in the art. Also, pumps for fluid transfer may not always be shown; nor are tanks indicated, although these may be required for storage of process liquids at either intermediary or terminal points.

Figure 2:
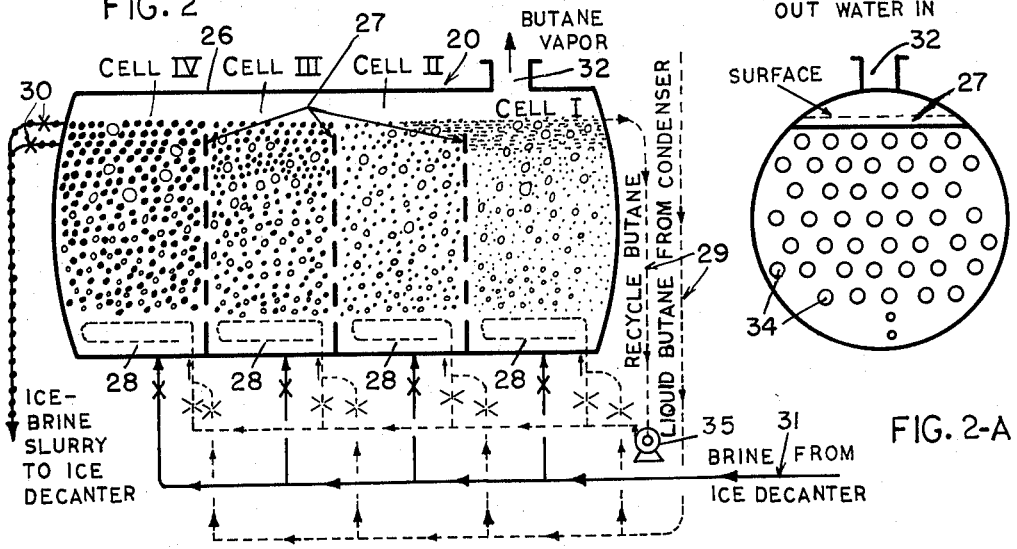
FIGURE 2 is a longitudinal cross-sectional view of one form of freezer.

FIGURE 2-A is a cross-sectional view taken on FIGURE 2 illustrating details of a baffle plate.

FIGURE 3 is a vertical cross-sectional view of one form of ice decanter.

FIGURE 3-A is an enlarged vertical cross-sectional view of an impeller used in the ice decanter.

FIGURE 3-B is a bottom plan view of the impeller.

FIGURE 4 is a vertical cross-sectional view of one form of spray condenser.

FIGURE 5 is a vertical cross-sectional view of one form of liquid-liquid-liquid heat exchanger.

FIGURE 6 is a more complete flow sheet illustrating in cross-section the components of a plant for practicing the process in accordance with the present invention.

FIGURE 7 is pressure-temperature graph of various concentrations of isobutane mixtures.

FIGURE 8 is freezing point-concentration graph of various aqueous solutions.

Figure 1:
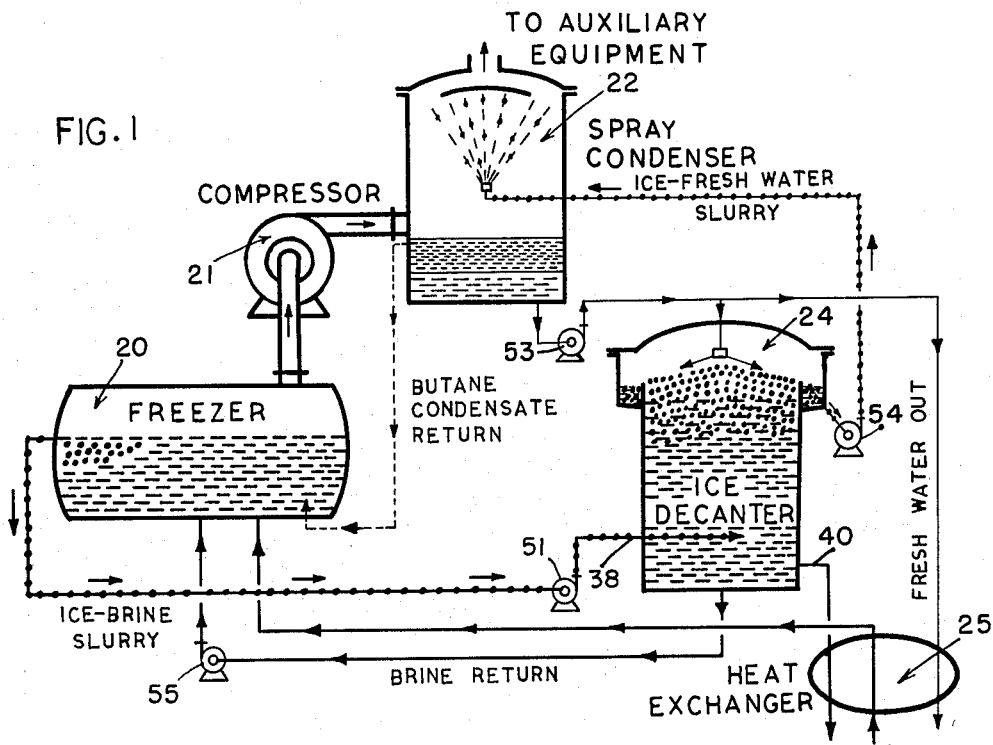
FIGURE 1 is a simplified flow sheet illustraing in cross-section only the essential components for carrying out the process in accordance with the present invention.

FIGURE 9 is a simplified flow sheet similar to that shown in FIGURE 1, except an absorption refrigeration system is shown instead of a mechanical compression refrigeration system.

FIGURE 10 is a more complete flow sheet of the system shown in FIGURE 9.

GENERAL DESCRIPTION

Referring now to the drawings in detail, there is shown in FIGURE 1 a system essentially comprising a freezer 20, a compressor 21, a spray condenser 22, an ice separator such as a decanter 24, and a heat exchanger 25. This system is of the mechanical compression refrigeration type wherein a conventional compressor 21 is employed. The construction and operation of the other components shown will be described in detail hereinafter. The auxiliary equipment required for handling vapors not condensed in the condenser 22 is of a conventional type and is not shown.

FREEZER

The freezer 20, as shown in FIGURE 2, is in the form of a horizontal tank 26, having a chamber subdivided into compartments labelled Cell I, Cell II, Cell III, and Cell IV, by perforated baffles 27 (FIGURE 2-A), which do not give absolute division, but do control the trend of concentration of brine to increase definitely left to right. More baffles to make more cells may be used to increase this effect. Each cell has one or more "hair pin" shaped return-bend tubes 28 perforated with many small holes from 1 mm. to 3 mm. in diameter, for inlet of refrigerant liquid in the form of small droplets. Other piping connections 29 are provided for re-circulation of butane liquid skimmed from the surface of Cell I and returned primarily to this cell, and some to Cell II. Withdrawal of the ice-brine slurry from Cell IV may be through one or more of two or more valves 30 at slightly different levels near the surface level. Feed connections 31 for chilled sea water and of cold brine returned from the ice decanter are provided. A charge line to Cell I may be provided also—but it is not shown—for adding the refrigerant liquid initially—also for make-up. The same pipe may be used for addition of liquid for depressing the vapor pressure of the butane.

Agitation is controlled by the flash boiling action of the butane in coming to this vessel of lower pressure compared to the higher pressure of the condenser, also by the rate of re-circulation of the butane liquid drawn from the surface of Cell I through an outlet 32.

As shown in FIGURE 2-A, the baffle plate 27 is provided with holes 34, 3 to 6 inches in diameter and having a total area equal to one-third to two-thirds of the total baffle area. Preferably this baffle does not extend higher than about 3 or 4 inches below the liquid level. Ready flow of brine and ice crystals from right to left is allowed, while butane flows on the surface from left to right, due to the withdrawal for recycle. Very little butane is present as liquid on the surface of Cell III, and practically none on Cell IV.

The freezer is designed with a liquid depth of 4 to 10 feet; more depth is unnecessary and uneconomic, and less depth is less efficient in securing proper agitation. While this unit may most economically be made in the form of a low, vertical cylinder for large sizes, a long, narrow, horizontal chamber, as indicated, may be used for smaller capacities. Other forms may also be used, but it is in general found desirable to have a horizontal flow of at least about 20 feet from the inlet of sea water to the outlet of brine-ice slurry as a minimum. This distance of travel may be secured along a single dimension of length, as shown—or by baffled flow back and forth if more convenient in design. In some designs of the freezer for large installations, it is practical to build several such units, one above the other—as trays in a distilling column. In other cases for smaller units, it may be desirable to use a horizontal cylinder as indicated in FIGURE 2. In FIGURE 2 are shown four cells, separated by baffles, to minimize convection or other currents between the cells, and to control the flow. The number may also be larger to increase the effectiveness of this control of flow.

Since the freezer and all of the other major pieces of equipment are operated at pressures very near to that of the atmospheric, design characteristics associated with substantial internal pressure are not important. Preferably the operating pressure should be just above atmospheric, so that there will be no vacuum and hence no tendency in the case of leaks in the equipment, to draw air into the system. On the other hand, higher pressures are to be avoided because of the higher cost of equipment when built to withstand higher pressures. An absolute pressure of 1000 mm. of mercury is the highest that is necessary.

The "hairpin" tube 28 with many holes of 1 to 3 mm. diameter acts as a sparger for supply of returning liquid butane from the condenser to each cell of the freezer. The freezer is at a higher equilibrium vapor pressure of butane than is the condenser; and the butane immediately flash distills, to cause ebullition in the brine, and cooling thereof, as it passes through the small holes in the sparger in a stream or jet of liquid. This breaks up immediately into many small droplets which vaporize at least partially in agitating the saline liquid and rising to the surface.

This mechanical energy of the expansion of the refrigerant on boiling has usually been lost in prior art processes, but it has been found to be able to supply most of the mechanical energy necessary for the agitation of the liquid in the freezer when directed through the holes of the spargers into the freezing liquid, because of the increase in vapor pressure due to hydrostatic head of liquid.

The hairpin spargers 28 are parallel to the flow of brine in this continuous crystallizer. The pressure causing the flow of butane through the small holes may be augmented, if desired, over that already available in causing downflow from the condenser, due to the higher vapor pressure in the condenser and the gravity head. An additional external pump 35 may be used to increase this pressure and jet action, to increase the agitation effect in the brine which may be required for optimum rate of crystal growth up to any desired amount. This pressure drop and the corresponding flows through the holes also decrease along the hairpin from right to left, until the "U" bend is reached, then from left to right. Thus, for any given distance along the length of any cell of the freezer, there may be about the same total amount of butane flow-depending on the control of the valve supplying this hairpin sparger.

Also, the outlet 39 is provided to withdraw liquid butane from the surface of the brine in the freezer, and to recycle this back to the respective sparger, or to a separate sparger—particularly in Cell I and Cell II.

In FIGURE 2, only a single hairpin sparger is used—and this is shown as handling a combination of butane from the condenser and butane recycle. Usually no butane recycle will be added in Cell IV, nor much in Cell III. Greater flexibility in operation is secured if separate spargers are available, particularly in Cells I and II for butane from the condenser and from recycle. In the later cells no recycle butane is usually added, only the butane coming from the condenser.

One novel feature of the operation of this cellular type of freezer is that there are gradients of temperature, liquid concentration, and crystal size from right to left. The freezer 20 shown in FIGURE 2 is for a horizontal, cylindrical unit; but it may represent flow from the greatest diameter inwardly to the axis if a circular unit is used. Then, in FIGURE 2, the left side would indicate the center of a circular tank; and the right side would indicate the periphery, or the more involved path if solid baffles were used to direct the flow. If a baffled arrangement is used, the passage from right to left of FIGURE 2 merely indicates the flow path—whatever the geometry may be.

This desired liquid concentration gradient is secured by:

(a) the normal flow relationship of brine entering on the right, and the brine-ice slurry leaving on the left;

(b) the addition of the liquid butane returning from the condenser in streams of droplets, preferably not over one to three millimeters in diameter, from sparger tubes near the bottom, in controlled amounts varying from right to left, to control the rate of removal of the latent heat of freezing of the ice crystallizing out of solution. A somewhat greater agitation on the left may usually be desired, and thus may be created by having a larger number of holes in the right spargers in Cells III and IV, or by controlling separate inlet valves on the liquid butane return lines. The relative amount of agitation simultaneously present in the several cells is so controlled as to cause a somewhat greater refrigeration effect and lower temperature on the left side, tapering to the right.

(c) The controlled addition and recycle with the liquid butane of a liquid for depressing the vapor pressure of butane as described elsewhere. The purpose of this control of agitation and refrigeration by greater butane addition where desired is to speed up the growth (i.e., increase the total mass) of crystals which will otherwise take place more slowly proportionally, as the crystals reach larger size and thus have more area for growth of ice on the interface in the left cells of the diagram as compared to the right.

(d) the skimming of the butane from the surface on the right side in withdrawing it to be fed back through a sparger tube or otherwise near the bottom. This recycle of liquid is primarily for agitation purposes, and the relative amount of flow to each cell may be controlled individually. If the vapor pressure depressant of (c) is used, only Cell I and Cell II to a lesser extent will receive this recycle which will in this way keep this liquid in the right of the freezer.

Since the concentration of the brine on the left has a higher depression of the freezing point, a greater refrigerating effect is needed there, or a refrigerant acting at a lower temperature would be desired. Also, this greater rate of cooling may be allowed since the larger crystals may add more weight of solids to their larger surfaces without danger of undue lowering of the temperature of the brine to a range where more fine crystals would be formed as new seed crystals.

The ice-brine crystal slurry is withdrawn at, or near, the surface on the left side—the far side of Cell IV—preferably; and by controlling the level of the draw-off, or by having two or more different draw-offs connected to the same discharge line as shown, the ratio of the brine withdrawn with the crystals may be readily controlled to give the desired relative apparent viscosity of the slurry being withdrawn, for pumping and handling otherwise effectively as a fluid. Usually, this would be a slurry containing 5 to 25% of the total mass as crystals of ice. This ratio will depend on many things, including the size of the crystals, also the type, mechanism, and shape of the ice-brine separator.

As already indicated, it is desirable if all crystals—and just the right number—are "born" in Cell I and grow progressively as the brine passes through the other cells. In this desirable case there would be a constant number of crystals per unit volume of saline liquid passing any given cell in a given time, while increasing in size therein. The cells are indicated in FIGURE 2 as all being of the same size, but this is not necessarily the case, and the baffles—in greater number than the three shown, possibly—may be spaced to give different volumes in the different cells.

Near the right side the formation of small crystals gives a relatively small amount of crystal surface per unit volume of the freezer, and hence there will be achieved a smaller rate of crystal formation, in pounds per hour per cubic foot of freezer, assuming that the crystal number per cubic foot of volume is the same as in other cells, and that the driving force for crystallization, the temperature difference between the bulk of the liquid phase and the crystal interface itself, is constant.

In the cells farther left, this rate of crystal growth may be increased per unit volume of the total mass due to the increase in size of the crystals, and hence surface or interface area. Hence, a somewhat greater amount of refrigeration effect can be advantageously utilized in Cells III and IV on the same number of crystals, now larger. Not only can more heat be removed per cubic foot, but it must be removed at a lower temperature, since the depression of the freezing point of the more concentrated solution is greater.

Furthermore, at this left side there is maintained relatively little, if any, butane in the upper supernatant layer, while on the right a supernatant layer of butane (containing any depressant liquid added) is present to be skimmed off and recycled.

There has been suggested above an additional balance and method of control of the refrigeration effect from right to left has been found which allows an optimization in each cell of the amount of crystal mass added to the ice forming as crystals.

This now will be discussed more fully as related to the present operation: It is a well-known fact that the addition to one liquid of a higher boiling liquid normally reduces the vapor pressure of the first liquid, and hence increases the effective boiling point. (The less usual relation of the formation of a minimum boiling azeotrope does not need to be considered with homologues or other closely related liquids, or with liquids of greatly different boiling points as in the present case.)

The effective boiling point of the refrigerant at the pressure maintained in the freezer—assumed to be about atmospheric—is necessarily below the freezing point of the solution; and the difference is the driving force which removes the latent heat of fusion and causes freezing.

In the present case a small amount of naphtha or gasoline in the octane to decane range, toluene or xylenes, or chlorinated hydrocarbons in the general boiling range of 100° to 175° C., is added to obtain a maximum increase of the effective boiling point of the butane by from 1 to 4 or 5° C. The amount added will be only a few percent of the total butane in residence in the freezer at any one time; and this is added to Cell I. This is as a liquid, which vaporizes very little in the process. It will tend to rise to the surface—mixed with butane—and be skimmed off in the recycle operation. By control of recycle of liquid butane with this higher boiling liquid dissolved therein, principally to Cell I and some smaller amount to Cell II, there will be very little, if any, of the higher boiling liquid which will pass to Cell III, and none to Cell IV. Meanwhile, larger amounts of butane from the condenser are sent to Cell III and especially to Cell IV, than to the first cells. The degree of refrigeration from right to left may thus be controlled so that the optpimum yield in weight of crystals per unit volume may be obtained from each cell, rather than slowing down the crystallization rate of the unit as a whole to that of its slowest part, as has been necessary in prior art processes to prevent formation of new and undesired seed crystals in the later part of the freezing cycle.

The baffle arrangement in the freezer dividing it into cells effectively regulates the flow of brine and crystals from right to left, while allowing convection and agitation currents within each cell. The cell structure of the freezer and the control of liquid flows thus establishes and maintains the desired operation with no brine movement left to right, thus:

(a) concentration gradient of salt dissolved in brine from right to left of greatest concentration discharged in the brine-ice slurry on the left;

(b) size gradient from right to left of ice crystals, largest ones discharged in brine-ice slurry on left;

(c) concentration gradient from right to left of total ice mass per cubic foot of liquid, greatest concentration discharged as brine-ice slurry on left;

(d) depth of layer of liquid butane on the surface from right to left, reduced to zero on the left at discharge of brine-ice slurry;

(e) concentration gradient of vapor pressure depressant in butane from left to right, with zero concentration at left.

However, the baffle arrangement and the control of flow of materials does not prevent the maintenance of the desired substantial constant number of crystals per unit volume throughout each cell.

It should be noted in the above that the agitation required to allow optimum crystals growth is relatively mild in the present case, since the rate of heat transfer and mass transfer is relatively good in this type of crystallizer, and this agitation is controllable within limits in each cell—by the amount of butane allowed to enter (a) from the condenser, and (b) from recycle, also by the rate of addition of (c) fresh sea water, and (d) recycle brine from the ice-decanter.

This agitation does not require the crystals of ice to be maintained at any particular level of the brine solution, and their lower density compared with the brine tends to cause them to rise. However, the surface of the crystal must be constantly in contact with a new amount of brine, slightly super-cooled, to allow the crystal growth to proceed as mentioned above, controlled by heat transfer and mass transfer or diffusion of water to the crystal and more concentrated brine away from the crystal. Thus, agitation is required to keep the crystals from collecting at the surface.

Ice crystals are withdrawn from an upper level or near the surface of the brine in a slurry therewith on the left side. The withdrawal of crystals from near the surface on the left is controlled so that adequate mother liquor is simultaneously withdrawn in order to cause a suitable slurry, which may be pumped. This may be conveniently arranged by having two or three valved outlets at slightly different heights connected to a header, so that more or less brine may be withdrawn. Having once set the valves for a desirable ratio, preferably 5 to 10% ice, the withdrawal continues without further need for adjustment, the large amount of brine giving fluidity in the pumps and piping.

In the present operation it has been found that the height of liquid may be from 4 to 10 feet in this preferred design of the freezer 20, all of which is maintained as fully effective crystals growing space by the operation of the several controls to give agitation and flow of materials. The only parts which are not growing crystals are the vapor space and the small volume of butane floating on the surface and mixed with some of the vapor pressure depressant liquid in Cell I and II. A preferred brine depth is 5 to 6 feet.

Any desired degree of agitation over that available from the boiling of the butane is readily accomplished by the expansion of butane coming from the condenser due to the head of gravity or the pumping action and recirculation of butane withdrawn by skimming of the liquid butane layer. This is recycled back to the freezer to give the desired additional agitation; and this agitation maintains an adequate supply of solution around the ice crystals which are forming; i.e., reduces the film of concentrated brine around the crystal as the water is removed to the solid phase.

It has been found that the operation of a recycle butane pump 35 as the external source of power for any agitation needed over that caused by the butane in flash boiling, has several practical advantages over the use of an internal agitation system. Particularly this allows the control of agitation, hence crystal growth—and also minimizes maintenance required of the equipment—i.e., no moving parts internally—no stuffing glands, etc. As noted above, a similar butane pump discharging through holes or jets in a separate hairpin sparger may give additional agitation in Cells I and II, especially in returning of butane from the condenser. This may be desirable in very large units.

Furthermore, it has been found that the operation of this freezer by using the agitating effect of the butane droplets vaporizing in the freezing liquid alongside and in contact with the ice crystals being formed, has a more uniform and efficient action than that of a mechanical agitator of any degree of cutting action which could be used without intefering with or demaging crystal growth. The droplets of liquid butane or bubbles of vaporous butane—and usually both phases are present in the freezing liquid—pass in between the crystals of ice and agitate and displace the liquid immediately adjacent the crystals. By rising away from the crystals, the butane allows new brine to rush into the space it occupied adjacent the interface; and the process is repeated gently but effectively, probably millions of times per hour in each cubic foot of crystallizing volume. The butane cannot break through to contact the solid surface of the crystal itself because of the much greater wetability of the crystal by or with the brine. Hence the crystalizing effect is not diluted by the butane, which in addition to its refrigeration effect also acts as a "wiper" for the films surrounding the individual crystals it meets and brushes against (almost but not quite) in its passage through the brine. The smaller the droplets, the more times the wiping action occurs, but the less energy it may have each time. This is true for either liquid drops or vapor bubbles, or both combined. In the cells of FIGURE 2, the sparger tubes may well have smaller holes in cells on the right and larger ones on those on the left to take full advantage of this fact.

Obviously, also since the butane function is first of all to remove heat from the crystals, to allow them to freeze, the close contact helps greatly in the volumetric heat transfer, and hence in the capacity of the freezer.

Unlike boiling in an evaporator where there must be considered hydrostatic head in its effect on the rate of evaporation, hydrostatic head has little or no effect on the freezing process itself. This is because freezing or crystallization is substantially independent of the pressure, within the ranges to be encountered in processes such as the present. Hydrostatic head does have an effect on the boiling of the butane—and thus on its refrigeration and agitation effect. However, these functions are controllable to a larger extent by other operating variables; e.g., the rate of recirculation of the liquid butane and the relative amounts permitted to flow in each of the different sparger outlets to the individual cells.

In the prior art of freezing by direct volatilization of the refrigeration in contact with the brine, there has often been a limitation on the effective height of the freezing or cooling zone in which the refrigerant fluid could be in contact with the liquid. This was because of the danger of too great heat transfer from the vaporization fluid while rising to the surface through the greater height with accompanying excess super-cooling of the brine and freezing out of many more seed crystals than are wanted—or than can "grow up" to the desired size. This limitation has reduced the effective use of the refrigerant's passage upwardly through the brine and has therefore decreased considerably the capacity of the freezer while increasing the time of residence of the brine therein. Even more, it has reduced the effective depth of the freezer and thus, particularly in large sizes, has made large horizontal cross-sectional areas of the freezer with accompanying large costs thereof, especially when the cost of the agitators for these shallow tanks is considered.

The present design is relatively unaffected by the head of brine above the butane droplets entrance (or lowest level in agitation or jet action downwardly) because of:

(a) the control of the relative volatility of the refrigerant by the addition of a vapor pressure depressant can control the rate of evaporation of refrigerant on the first cells to prevent an unduly high rate of evaporation and hence excessive super-cooling;

(b) the cellular design and action of the freezer allows the optimum rate of super-cooling in each stage of the refrigeration cycle;

(c) the pumping action to return the recycle butane from the surface (with or without vapor pressure depressant liquid) to the bottom or near the bottom makes a system independent of depth from fluid flow considerations; also it allows the thorough agitation at all depths down to the bottom.

These three functions taken together are interrelated to give an efficient, simple, economic system.

In the present device there are no internal moving parts, but the operation to give an optimum production of ice per cubic foot may be controlled by:

(a) the rate of evaporation of the butane and hence the cooling or freezing capacity of the system as a whole, and thus the rate of cooling through return of butane from the condenser;

(b) the rate of mechanical withdrawal of the butane layer from Cell I for recycle to give agitation, primarily to Cell I and Cell II;

(c) the method of addition of the liquid butane from the condenser to the butane withdrawn from the right side of the freezer, and thence back to the sparger system; i.e., whether added in the same or different hairpin coils in Cell I and II, and/or pumped back at high velocity;

(d) the amount and boiling range of the vapor pressure depressant liquid added to the freezer, which, by the recycle system of skimming the refrigerant liquid from the brine in the freezer back principally to Cell I and to a small extent to Cell II, may be controlled in the amount present, varying from maximum in Cell I to practically zero in Cell IV. This allows the maximum throughput by limiting the amount of heat transfer, and hence the number of seed crystals formed in Cell I to the number which can be grown to the desired average size in the freezer as a whole;

(e) the relative amounts of butane from the condenser and from the recycle, returned to the different sparger systems of each cell; and (f) the rate of withdrawal of ice crystals and brine, and the volume ratio of brine to ice crystals which accommodates or controls the motion of the ice crystals from right to left. Because of the simplicity of operation of the ice decanter to be described, and the desire to allow a substantial amount of solution from right to left through the cells, the amount of the crystals in the brine may usually be in a ratio of about 5 to 100 to 5 to 50 parts of brine. The brine is readily returned from the ice-decanter.

The different variants of the control pattern allow a great deal of flexibility in the operation of the unit to secure the best performance under the conditions which may vary slightly during an operating cycle.

It should be noted that butane is always added as liquid droplets entering into the liquid phase of brine, preferably at a high velocity to give agitation, usually near to but not necessarily at the bottom of the freezer; desirably this may give at least 4 feet, and preferably 5 or 6 feet or more of brine liquid above the point of entry for the butane to rise through, evaporating during most or all of this vertical travel. Sea water is always added as a bulk phase, preferably at a low velocity. The liquid butane stream which breaks up gives droplets preferably about 1 to 3 mm. in diameter, and this stream may be added with considerable jet action for agitation purposes by the use of a centrifugal or other type pump to supplement the pressure head in the descent from the condenser.

Furthermore, the holes in the sparger pipes may be fitted with short lengths of tubing or other nozzles to give a more directed flow to increase the agitation effect, and these may be directed in any direction for that purpose. Also, by locating the spargers (hairpin or other shape, depending on the design of the freezer and arrangement of the baffles) somewhat above the bottom with liquid butane discharging downwardly, either vertically or at some angle with the vertical, the agitation pattern may be increased in some shapes of freezers. The direction of the butane downwardly in a freezer of a depth of 6 or more feet may desirably give a greater travel upwardly than usually, and as much as 6 or more feet, with accompanying agitation and increase in capacity.

Also, there may be a larger number of cells in the freezer than the four indicated in FIGURE 2. These may be of equal or unequal size; and the reference to Cell I and Cell II means simply a number of cells closer to the brine inlet, while Cell III and Cell IV means a number of cells closet to the ice-brine discharge.

As already indicated, the butane flow is so controlled as to minimize the amount as liquid butane on the surface of the cells to the left of FIGURE 2. A suitable baffle arrangement is also provided to minimize withdrawal of butane with the ice-brine slurry. Any small amount of butane inadvertently going with the ice-brine slurry will pass to the ice decanter, thence ultimately by overflow with the crystals it will be picked up with the fresh water slurry—from which it will flow through the condenser and back to the decanter.

Alternately, liquid butane which does pass to the ice decanter may be withdrawn through one of the several valved outlets 36 indicated in FIGURE 3 on the side, at the level where it will float on the brine surface. These valves are connected by piping, not shown, to the butane recycle pump and thence back to the freezer.

Another way of indicating the agitation effect in this invention of the butane, as well as its usual refrigeration effect, in such processes, is by consideraton of the expansion of its vapors in rising to the surface. These vapors are formed substantially at the lowest depth of the freezer. This might be 5 to 6 feet or more of brine, with an average specific gravity of 1.04. This gives a hydrostatic head varying upwardly from about 115 mm. of mercury. The vapor pressure of the butane at the given temperature must be sufficient for it to boil at this increase in pressure over the surface pressure in the freezer. This is a desirable minimum hydrostatic pressure, and hence increase in vapor pressure for the operation, and this may go up to at least 175 mm. of mercury, under the conditions of this freezing operation with the obvious attendant advantages.

Fundamentally, the operation depends on the effective presence for agitation and heat transfer purposes of the butane in both liquid and vapor phases distributed throughout the entire mass of brine-ice medium down to the bottom where its action is equally valuable even 5 to 9 or more feet in depth for securing optimum crystallization.

ICE DECANTER

The ice decanter 24 shown in FIGURES 1 and 3 is in the form of a vetrical tank 37 having an ice-brine slurry inlet 38, a fresh water-ice slurry outlet 39, a brine outlet 40, and the butane outlets 36, already mentioned. A cylinder of ice is pressed upwardly by the buoyancy of the brine; and it is continually being trimmed at the top by a jet stream of fresh water, having either one or more rotating jets, a circular jet, an impeller 41 having a fresh water inlet 42 and turning at a high velocity at the apex of a flat cone, or a steady circular sheet of water issuing between the peripheries of two stationary plates machined at a small angle.

This jet stream, however formed, washes off ice crystals which discharge into the peripheral launder or trough in an ice-fresh water slurry, which is picked up by a pump for transfer to the condenser. The angle of the jet is adjustable to control the "trimming" action for trimming off the top crystals. This angle with the horizontals depends on the radius of the ice-separator tank, and the velocity of the jet issuing therefor, also with the amount of fresh water which is desired to pass downwardly to wash the crystals. In general, the angle with the horizontal of the jet trimmer may be from about 10° to about 30°, and the jet velocity may be from about 15 feet per second to 150 feet per second.

A small amount of wash water passes downwardly through the crystal mass and mingles with the brine below. However, by so controlling the amounts of: (a) inlet of brine slurry, and (b) outlet of brine, as well as (c) the amount of ice crystals trimmed off the top, the effective flow of wash water down through the crystals may be made as small as desirable, and thus no large amount need be taken in from the fresh water spray trimmer.

A domed roof 44 is provided over the conical top of the floating cylinder of ice crystals, to enclose the jet-spray, the launder, and the crystals. The atmosphere inside this dome is substantially butane vapor. Sight windows allow visual inspection of the trimming action of the jet. An external motor 45, driving a hollow shaft 46 through a stuffing box 47, performs the rotation of the impeller. A mechanical arrangement of a screw device (not shown) may permit the elevation of the jet and the change of its angle from outside of the domed chamber to adjust the performance which is controlled, largely based on crystal size and the rate of supply of brine-ice slurry. The same type of controls are necessary, as well as a speed controller on the shaft, if there is used for the jet trimmer a rotating, grooved disk or impeller, similarly to that used in a spray drying tower.

FIGURE 3A shows an impeller 41 to give a jet spray for trimming the ice crystals from the top of the floating mass. It is suspended on the hollow shaft 46, with packing glands 47. Through the shaft from the inlet 42 passes the cold fresh water, and this is discharged from the high speed impeller at the velocity necessary to trim the crystals. A V pulley 48 shown in cross-section may be rigidly attached to the hollow shaft, or it may be attached with a spline keyway so that the shaft may be elevated or lowered with the impeller beneath, but without changing the level of the pulley. A V-belt 49 drive and the motor 45 drive the pulley, shaft 46, and impeller 41. The whole assembly may be elevated or lowered by a vertically adjusted bearing, not shown; and thus the height of the ice trimming may be adjusted.

The difference in density of ice crystals and the concentrated brine in which they are grown is sufficient to cause a given mass of crystals to rise from a quiet suspension with a fraction of their mass actually floating above the brine surface. This has been used in an ice decanter to allow separation of crystals from brine. This floating is analogous to an iceberg floating with a part of its surface out of the water. The mechanical support of the submerged crystals due to their buoyancy elevates the upper ones above the liquid. There is empty space 50 between the crystals above the surface since the liquid drains down. This free space gives an additional apparent buoyancy to the mass as a whole; thus, a larger apparent volume of crystals is above the brine surface than in the case of a single crystal, an iceberg, of which only about 10% may be above the surface. Brine drains downwardly from the crystals and between them by gravity from those crystals above the liquid surface.

A slurry pump 51 (FIGURE 1) feeds the brine-ice slurry from the freezer to the ice decanter 38; and another pipe connection allows the mother liquor to flow back from the bottom of the decanter at 40 to the freezer as fast as the ice crystals settle upwardly therefrom. The ice crystals rise through the pre-determined level of the brine, which is maintained and controlled by the relative rates at which crystals and brine are removed from and supplied to the ice decanter.

The spray jet action is designed so that by controlling the amount of fresh water supplied, the velocity and dynamic inertia of the stream cuts off the surface of the mound of ice crystals and removes the top layer. Their mixture with the water of the jet forms an ice-fresh water slurry caught in a launder or trough 52 surrounding the top of the ice decanter. From this trough the ice-fresh water slurry flows to a pump 54 (FIGURE 1) which then passes it to the spray condenser described hereinafter.

The jet of fresh water thus accomplishes three purposes:

(a) it mechanically removes the ice crystals by "trimming" the rising mass at the predetermined heights;

(b) it slurries these crystals into a fluidized state which may then flow from the trough into the pump and be handled as a fluid, while at the same time mechanically mixing this slurry;

(c) it allows a certain amount of the fresh water supplied to the jet to permeate down through the mass of ice crystals; and this acts as a wash liquid which may be controlled in amount so as to include from 1 to 4% of the total water produced, the maximum required when an average crystal size of 0.5 mm. is produced by the method described in the freezer.

These several effects are controlled by:

(a) the design of the jet, the size and shape of its orifices, and the rate of rotation, if any;

(b) the amount of water passing, hence the velocity of the jets;

(c) the angle of the jets with the horizontal; i.e., the angle of the cone generated;

(d) the effective level of liquid in the decanter. By increasing this height, the tendency for fresh water to work down through the crystals and to the brine itself, may be regulated to an almost negligible amount; this controls the amount of wash water used on the crystals to remove the brine thereon.

The relative dimensions of the ice decanter are quite important since, in the general case, a mass of crystals floating at least 1 or 2 feet above the surface of the brine is highly desirable in order to give the best countercurrent washing action of that fraction of the fresh water removed from the condenser and the liquid decanter which is allowed to be used as wash water by passing down from the stream from the trimming jet. The size of the crystals and the voidage giving this floating action and the height of the crystals above the brine level will control the apparent density of the crystals above the brine level. This voidage may, however, be partly or almost completely filled with wash fresh water working downwardly.

With the crystal size and purity made in this process in the freezer, the usual centrifugal separator may be used, but it has been found uneconomic except in small size plants; i.e., up to about 50,000 gallons per day.

The usual centrifuge, with its much higher cost and attendant power requirements, is not necessary for the phase separation of ice crystals from the concentrated brine coming from the freezer. The high power requirements of the centrifuge, the windage—or suction through the machine—are particularly a disadvantage because the energy so used is then added to the total thermal energy in the slurry, melts ice there, and thus substracts from the cooling effect available in the condenser. This requires more energy in the auxiliary compressor. Any savings in energy here by the elimination of the centrifuge are at least doubled, and usually much more than doubled, depending on the efficiency of the refrigeration system.

As a convenience in the operation of the plant, one or more branch lines 36 are connected at points in the wall of the ice decanter at the height of the normal level of the brine. If butane comes with the ice-brine slurry, it will accumulate at this level—floating on the brine—while partially at least passing the wash water descending down through the crystal mass. This butane may be withdrawn directly back to the suction of a pump 55 (FIGURE 1) returning brine to the freezer. This connection is not shown in the flow diagrams as it is a relatively unimportant refinement of the operation.

SPRAY CONDENSER

The spray condenser 22 shown in FIGURES 1 and 4, is in the form of a vertical tank 56, having a butane vapor inlet 57, a fresh water outlet 59 provided with a pump 53 (FIGURE 1), and a butane condensate outlet 60 connected for return of the condensate to the freezer 20, and further having installed therein a separator 61 for the aqueous and butane phases. The slurry of fresh water and brine passes through a spray condenser with sprays having nozzles with a relatively open passage for liquid—no passage for liquid of which has a cross-section diameter less than 25 to 50 times that of the diameter of the largest ice crystal to be handled. Rotating jet nozzles give a satisfactory mechanical action of spraying as do also mechanically or hydraulically operated impellers.

The droplets discharging in the spray are an average size no greater than twice the greatest dimension of the ice crystals; and they condense butane vapors while the crystals melt. The travel of the droplets is no less than 4 feet, preferably from 5 to 8 feet. During the free "flight" of these droplets through the open space of the condenser—filled with vapors of butane—the ice crystals melt. The mixture of water and butane liquid is at the melting temperature of pure ice; i.e., 0° C.

The spray impinges on a domed baffle; and the liquid drops back, much of it in a curtain from the periphery of the baffle. The mixture of two insoluble liquids fills the lower part of the vessel. The butane rises to the surface and is withdrawn as an upper layer, the fresh water is discharged from the bottom. A suitable baffle allows a minimum of agitation in the two layers, to improve separation, particularly near the overflow discharge of butane on the left. Another baffle protects the inlet vapor line from spray. An inverted—vented—syphon or trap of controllable height permits continuous withdrawal of butane liquid and operation at an interface level controlled by the level of the overflow of the lower layer through this trap.

The spray condenser in FIGURE 4 is a conical spray chamber with a cylindrical liquid separator beneath. In a large unit there would be many such sprays, so arranged as to "fill" in, so far as possible, the entire condensing volume. The ice-fresh water slurry is picked up from the launder 52 surrounding the ice decanter, and discharged by the pump 54 into the spray nozzle 62. The ice-fresh water slurry may vary from 1% to 30% ice-to-water. A suitable range is usually about 5% to 10%. This ratio depends upon the type of spray and pumps used. The spray itself may be a disk or impeller with grooves as in a spray dryer, rotating at extremely high speed, or it may be an open nozzle of a stationary type designed so that it will not be plugged with the ice crystals; thus it will have a ratio of diameters to that of the ice crystals of at least 10 to 20 times. A whirling spray is also satisfactory, although it does not usually give the optimum "filling" of the volume of the cone with spray, and normally gives a hollow conical spray. Such a spray has been found to have a lower capacity when used in this condenser design; and a conical spray pattern "filled" with droplets is preferable.

The ratio of ice to fresh water in the slurry controls the surface on which butane vapors may condense to give up its heat to the ice-water slurry. In the usual case, it has been found that a distance of travel of the drops in the spray of about 5 feet is necessary to allow the condensation of sufficient butane in this travel time for the melting of the ice in the droplet-crystal combination. A larger travel than 10 feet is unnecessary, and wastes space.

The butane condensate and the liquid of the slurry and that formed by melting of the ice water, decants in the lower or cylindrical part of this condenser vessel; the butane is skimmed off the top and goes back directly to the freezer vessel, as indicated above.

The spray condenser has substantially the same design as the spray absorber discussed hereinafter. The sprays in the condenser are above a decanter, while in the absorber, they are above a single liquid layer of the absorbent oil, of sufficient depth to cover submerged tubes in which is circulating cooling water.

HEAT INTERCHANGERS

The heat exchanger 25 shown in FIGURE 5 is in the form of a vertical tower or tank 65, wherein there are two different streams of chilled liquid—the product fresh water, and the product brine—which are to be heat interchanged with a single stream of immiscible liquid, a light naphtha gasoline, or similar hydrocarbon fraction sufficiently refined so that it will impart no extraneous taste to the water. This naphtha stream is, in turn, heat exchanged to chill the incoming feed.

In FIGURE 5 the combined heat exchanger is actually three liquid-liquid interchangers built in a single vertical tower 65, with exchangers 66 and 67 for warming the product fresh water and the product brine built as half cylinders. These are placed below an exchanger 68 occupying the full cylindrical cross-section for chilling the incoming sea water. The sum of the streams of the two products (brine and fresh water) is obviously equal to that of the feed sea water.

The naphtha enters the bottom of the two-stage unit, at 59 the lower stage of which is divided into two parts—one (66) for the fresh water from the condenser entering at 70, and one (67) for the brine from the ice-brine decanter entering at 71. After rising against these two (completely separated) streams, the naphtha is chilled and passes upwardly through a division plate 72 to the upper stage. This division plate may be constructed in any one of several ways to prevent the descending droplets from the upper plate to go through it downwardly.

One such construction is the familiar bubble cap and riser assembly 74 similar to that on a usual tray in a distilling column, but the riser may be somewhat longer; i.e., 4 to 10 inches, to allow a clear settling out of the raw sea water entering at 75 being chilled in this upper stage. The naphtha passes under and around this cap—which acts like an umbrella—and rises against the descending stream of raw sea water which enters through a sparger pipe 76, or similar device, as the familiar descending droplets. The naphtha, now warmed again, overflows the top of the upper stage 68 at 77 and is pumped up at 69 through the two stages in a recycle operation by a pump 78.

The naphtha, in its contacting of the aqueous phases, acts the same as the solvent in a countercurrent liquid-liquid extractor; and the design of such an extractor unit utilizes the functions and principles developed for such extractors. It functions also as an extractor in the present case by extracting the butane dissolved in both the brine and the chilled fresh water into the hydrocarbon liquid. This is a very small amount because of the high insolubility in water of hydrocarbons—even the lower ones.

However, the naphtha is even less soluble; and both streams go off saturated therewith. If the naphtha is relatively well refined, simple aeration of the water produced will discharge it from the fresh water and there need be no residual odor or taste. The aeration also tends to remove some of the "flatness" associated with pure water and makes it more pleasant to the taste.

On the other hand, the small amount of butane which is continuously being extracted by the heat transfer fluid, naphtha, will build up in that liquid. Periodically, a small stream of the naphtha may be withdrawn and stripped of butane in a continuous distilling unit; and then both hydrocarbons are returned to the respective parts of the system by way of the storage tanks necessary for make-up of losses.

Alternately, there may be used advantageously, the heat interchanging Method of Cooling Volatile Liquids described in co-pending application No. 241,721 of December 3, 1962. This is an open flash evaporation of a volatile liquid (sea water), an open or direct condensation on a cold liquid stream (cold fresh water leaving); and a closed condensation on tubes carrying another cold stream (cold brine stream leaving).

An unexpected advantage accrues in this usage: sea water, in cooling from 72° to 32° F. loses 40°, or about 40 B.t.u. of sensible heat per pound. Two pounds feed make one pound of fresh water and one pound of brine, thus flash evaporation gives 80 B.t.u. or about 0.08 pound of vapor. This adds an equivalent amount of condensate to increase the fresh water product by 8%, and a corresponding lowered unit cost.

However, for small units, where greatest simplicty is desired, there may be used a standard heat exchanger such as the ordinary shell and tube type.

AUXILIARY EQUIPMENT

Thermodynamically, the heat given up to boil liquid butane to produce vapors by the freezing of water from brine in the freezer should be the same in amount as that available to the vaporous butane for melting of ice in the spray condenser; and if there were no heat losses, or other energy requirements, there would be a substantial complete condensation in the spray condenser of all the vapors formed in the freezer.

Practically, there is heat flowing into the unit from the warmer, ambient conditions. This requires an additional refrigeration effect. Also, there must be accommodated other energy flows into the system, including heats of solution, and other thermodynamic and mechanical inefficiencies, power requirements of pumps, etc. Because of these inefficiencies there must be compressed by the compressor 21 as a greater amount of butane vapor which is evaporated from the freezer 20 than can be condensed in the condenser 22. The difference represents the additional refrigeration load over the minimum thermodynamic requirement; and it is measured by the amount of vapors which must go to auxiliary equipment and will be taken care of by an additional compressor and an additional condenser. The vapor discharge connection from the main spray condenser 22 goes directly to an auxiliary compressor, and from here to an auxiliary condenser. The auxiliary condenser may be the same type of condenser utilizing, for example, fresh sea water, as being the most readily available means of removing heat. This may be the same type of spray condenser, with a decanter below. This additional stream of sea water is then wasted and the liquid butane is returned to the freezer 20 to be reused.

If absorption refrigeration, as described hereinafter, is used, there is the same requirement for auxiliary equipment, and a duplicate refrigeration system operating at higher pressures and temperatures is required. Again, it may be the same type—since if one type is preferred for the main system, it may also be preferred for the auxiliary system. However, there may be some circumstances wherein absorption might be advantageous for the auxiliary system, after the compression system, or vice versa.

Isobutane

FIGURE 7 is a graph of the vapor pressures in millimeters of mercury of a commercial grade of isobutane (the top sloping line), and of various mixtures with a commercial grade of octane (the other and almost parallel sloping lines) of indicated percentages of the commercial isobutane mixture. The plot is made by a method described in Ind. Eng. Chem., vol. 32, p. 841, 1940, and is a logarithmic graph of the vapor pressures of the hydrocarbon mixtures on the vertical scale plotted against the vapor pressures of ice always at the same temperatures indicated at the bottom. (The vapor pressures of ice are also the vapor pressures of the saline solutions in which it is in equilibrium.) The temperature scale is indicated on the top. This chart enables the study of the effect on the vapor pressure by the addition of octane, and it enables the determination of the necessary amount to be added to the isobutane in order to decrease the boiling point a desired amount and hence increase the temperature drop available for removing heat from the ice crystal (always at a higher temperature) from the brine and then from the butane liquid (always at a lower temperature). The available temperature drop so resulting controls the rate of heat transfer from ice to boiling butane, and hence the rate of crystallization. As always, hydrostatic head has an importance in adding to the pressure and hence reducing the boiling temperature; and such head must be considered.

CONCENTRATION OF AQUEOUS SOLUTIONS OF DISSOLVED LIQUIDS

As indicated above, the more important utilization of the process of this invention will be in the removal of potable water from sea water and other naturally occurring waters where the amounts of solids are too high for potable and other uses. Also, important will be the concentration of solutions of salt, sugar and other solids coming in industrial liquors in a more or less pure form, or mixed solids as those in pulping liquors from cellulose production. Herein the water is removed as ice crystals to give a more concentrated solution of a solid, very much as in the case of salt from sea water referred to as exemplary.

In many of these cases of industrial utilization, especial advantages pertain, thus in sucrose solutions—from beet or cane—the preliminary concentration may be accomplished much more cheaply than by evaporation, and without the inversion and loss of the sugar to a minor amount which accompanies heating and evaporation of the solutions thereof. However, with sugar solutions, as with some others, the viscosity increases rapidly with concentrations above about 40% solids, and that may be regarded as a desirable but not complete limitation. As shown in FIGURE 8, the freezing point of 40% solutions is only $-5°$ C., so freezing is a very economical method of concentrating; also for liquors from pulping process, when freezing point depression is less.

It has been found that aqueous solutions of some other water soluble liquids may be more satisfactorily separated by the present process than by other processes. In the case of glycerol and of sulfuric acid, the liquids are so non-volatile relative to water as to be immediately comparable to salts and other solids normally encountered in aqueous solutions. Thus the concentrating operation proceeds in a similar manner without particular concern.

The concentrations of glycerol solutions can be accomplished economically up to 30 or 40% of glycerol by freezing the water therefrom. The freezing point of a 30% glycerol solution is about $-10°$ C.; and this is slightly above the normal boiling point of pure isobutane. Even lower freezing points may be reached utilizing other refrigerant liquids than isobutane while still having a pressure of approximately one atmosphere in the freezer. For a concentration above about 40% glycerol, however, the cost of obtaining the lower temperature required for the lower freezing point increases to give a greater processing cost than the evaporation of the water to increase the concentration. Particularly valuable is the process for dewatering dilute fermentation liquors containing glycerol in only a few percent. With or without the alcohol usually accompanying the glycerol in the fermentation beer, the water may be removed to give a concentration from 5 to 10 times that originally present. From solutions of such strengths, ordinary methods of distillation and evaporation may be used economically: with very dilute solutions, steam cost is excessive.

Normally, ethyl alcohol may be obtained from its aqueous solutions most readily by distillation to give a high proof alcohol. There are some cases, however, where a high proof alcohol may not be required, and it may be desirable to separate water from the alcohol, leaving other materials behind with the alcohol, rather than to separate alcohol from the water as is usually done.

In the concentration of ordinary potable beer; e.g., for removal of water to minimize shipping costs, it is desirable to separate out only pure water from the fermentation product and to leave the other flavoring constituents in the concentrate along with the alcohol. Thus it is desired to separate out only pure water so that, when pure water is added back to reconstitute the beer after shipment, the product will have the same composition and taste as did the original beer. If the beer is distilled to recover the alcohol, there will be a considerable change in the taste of the high proof spirits which come overhead when they are diluted as compared to the original beer, due to the fact that many non-volatile materials are left behind and more volatile materials are concentrated excessively. Also, there are chemical changes which have been found to occur in the small amounts of proteins present, for example, when the beer is heating even to a temperature of 40° or 50° C. Such changes, which give bad flavors, do not occur in cooling to the freezing point, although a relatively non-important cloudiness may occur during the freezing operation which may be filtered or removed by action of enzymes in the final product, without effect on the flavor.

Thus it has been found possible, in concentrating beer for potable use, to separate the water therefrom by the freezing process of this invention. When pure water is added back, the beer is reconstituted until it has the same taste, since it is identical to the material it was before the water was removed.

Thus it has been found possible to concentrate a beer from the usual fermentation product ranging from 4 to 8% by 4 to 8 fold; i.e., up to about 32% alcohol content by weight (38% by volume) by freezing out the water in the process described herein. When concentrated to about 20% ethyl alcohol by weight, the freezing point is approximately $-11°$ C., approximately the boiling point of isobutane which would desirably be utilized in a nearly pure form in this refrigeration process. When concentrated to about 30%, the freezing point is reduced to $-20°$ C., and a suitable refrigerant in this range is methylether, which has a boiling point approximately $-25°$ C. at atmospheric pressure, and thus would be slightly above atmospheric pressure. The maximum desirable concentration by this process has been found to be about 32 to 33% because at that range there is a formation of alcohol complexes in the crystals which results in loss to the final beer of alcohol. Methyl-ether propane, or propane mixtures with butanes or butenes, have been found to be suitable refrigerants in the range of concentration desired, with a maximum for concentration of ordinary potable beer; i.e., from about 5 to 8 times the strength of the fermentation material, depending on the operation of the fermenters.

The reconstituting is then done by addition of pure water at the point of use or repackaging. The concentration of beer is largely desirable from the standpoint of reduction of transportation costs, to remove the necessity of transportation of large volumes of water normally present in beer. Thus, tank cars of a 5 to 8 times concentrate may be shipped to distant carbonating and bottling plants near the point of consumption. The concentrate also has been found to have some advantages in keeping qualities, shelf-life, etc. The final product beer may be stripped of residual butane, methyl-ether, or other refrigerant in a simple vacuum distilling column.

The temperature in this column is not over 25° C., and there is thus no loss of flavor of the product. The butane is recovered with a small amount of alcohol (1 to 3%) to be recycled back to the system.

Still another aqueous solution of volatile material which may be satisfactorily dewatered, and for the same reason as potable beer, is ordinary edible vinegar, such as apple or other fruit vinegar. This comes from the fermenters or vinegar generators at about 6%–10% acetic acid, along with a large number of other acids and flavoring bodies. The concentration by distillation for removal of the water, which is somewhat more volatile than acetic acid, also removes many of the other constituents. This is a highly undesirable process because of the change in flavors, and also because of the difficulty of the separation of the acid from the mixed vapors which are obtained on distillation. Also, there is a major corrosive effect at these temperatures on most materials of construction, and undesirable corrosion products may appear in the concentrate. It has now been found possible to freeze, by the methods of the present invention, edible vinegar to a concentration of 3 to 8 times that from the generators, using butane or isobutane as the refrigerant to give the vinegar a strength of about 30% at a freezing point of $-10°$ C., or as high as almost 50% at a freezing point of $-20°$ C. Again in this lower temperature range, methyl-ether, methyl chloride, propane, or a chloro-fluoro hydrocarbon (one of the Freons) of similar boiling range may be indicated as one of the several refrigerants which may satisfactorily be used, if it is desired to operate the freezer at a pressure above atmospheric.

This process has been found to have advantages not only for dewatering commercial vinegar for the purpose of shipment with a minimum of water without changing the flavor (on reconstituting with pure water), but also it has been found desirable as a means of concentrating other and very much more dilute solutions from acetic acid. The cost of concentrating acetic acid by distillation is considerable, particularly in the more dilute ranges, as has been known for many years. It is usually uneconomical to concentrate the very dilute solutions which sometimes come in industry, either in production of acetic acid, pure, or mixed with other materials and in quite dilute concentrations as in the liquors resulting from the Fischer-Tropsch Process, after the hydrocarbons and other oxygenated compounds are separated by distillation. Washing operations—e.g., in textile treatment—also give very dilute solutions. Here there may be less than 2 to 3% concentration, and because of the difficulties of separating the vapors on distillation and the impracticality of solvent extraction, the dilute acid may be discarded to waste when possible. This may not always be done because of stream polution. It has now been found possible practically to freeze out the water from such dilute solutions, even those of ½% or less, by dewatering them through this freezing process, utilizing butane or isobutane or their mixtures. Methylether, propane, or other refrigerants, suitably may be used at lower temperatures than $-10°$, wherein the concentration of acetic acid in the mother liquor in the freezer is about 15%.

The maximum concentration which it has been found possible to reach by this freezing technique is about 60% acetic acid at about $-27°$ C. freezing point, where crystals of acetic acid are found, as well as crystals of water.

However, it is also quite often desirable to concentrate nearly to the anhydrous or so-called "glacial" grade acetic acid from solutions of 65–90% or higher strength. In some recycling operations even 90% strength acid may be discharged as "spent" acid for recovery. Such crystallization has been found to be profitable by the reversal of the process herein described. Thus the freezing technique is used to separate the acetic acid—in this case regarded now as the solvent, which crystallizes out according to the process of this invention with the water regarded as the solute which stays in solution. Acetic acid crystals are formed and are separated from the solution, now of lesser concentration of acetic acid. Acetic acid pure freezes at 16.6° C. and the usual so-called glacial grade of 99.5% freezes at 15.65° C. This side of the freezing point curve is not shown in FIGURE 8.

Because of the relative volatility of butane, methyl chloride—which boils at —23.47° C.—has been found desirable as the refrigerant. This boils at almost exactly the same temperature as methyl-ether. Ethyl-chloride, $CH_3CH_2$, which boils at 12.3° C., is also satisfactory for use where acetic acid of the glacial grade is to be crystallized. However, the solubility of these solvents in acetic acid is such that it is not possible to utilize them as direct contact refrigerant gases in the condenser, since no separation occurs in the liquid phase of the condensate unless there is a substantial amount of water in the acetic acid. Hence, the concentration may be limited to 95% or so of acetic acid; and, in any case, the acetic acid must be flashed free of the refrigerant after it is discharged from the system.

This freezing process of dewatering is even more useful for dilute solutions of formic acid, the homologue of acetic. Formic acid is even more difficult to dewater in dilute solutions than is acetic acid, because of its lower solubility in solvents which may be used for extractions. The processing follows the same general pattern as for acetic and solutions of low strength.

In the case of both acetic acid and formic acid, the freezing points of aqueous solutions go down rapidly to the eutectic points, —27° C. for acetic acid at 60% strength, and —49° C. for formic acid at 70% strength (not shown in FIGURE 8). It has been found economical to handle only dilute solutions in this freezing process; i.e., below 10% acid strength. The concentration obtained may desirably be as high as 40 to 45%. From this range, it is more economical to proceed to obtain glacial acetic acid, commercial 90% formic acid, or anhydrous formic acid by special distillation procedures which have been described and are well known to the art.

As mentioned above, this dewatering process may be used for separating water from mixtures of materials (e.g., the many components of sea water). Also in FIGURE 8 is shown the freezing point curves for the two lowest alcohols (methyl and ethyl) and the lowest organic acids (formic and acetic). In the Fischer-Tropsch process all of these, various ketones and esters, and other constituents, come in an aqueous solution of only a few percent concentration after the hydrocarbons produced are removed. This solution may be dewatered by this process to give a concentrate between 5 and 15 times the original. From this the components may be economically recovered. Still other industrial solutions or mixtures of two or more organic liquids may be dewatered economically in this manner.

As described hereinafter, an absorption-refrigeration system may be utilized advantageously in conjunction with the present method of de-watering aqueous solutions. Also, the co-pending United States patent application No. 241,721, describes a new Method of Cooling of Volatile Liquids which may take advantage of certain fractionating effects for separating two or more components of such volatile liquids during the cooling operation.

In the use of the method of flash evaporation described therein for cooling of a volatile liquid, such as beer, in combination with the present process for Freezing Water from Solutions, the cold exchanger for pre-chilling the feed may be a standard unit with the usual heat transfer surface; and if a flash evaporation unit is used, it should be with closed condensation since open condensation would tend to fractionate the alcohol away from the beer, a wholly undesired effect. However, in many cases, in de-watering such mixtures of volatile liquids, it may be possible to utilize the fractionating effect of the flash evaporation technique of the co-pending application simultaneously with the heat transfer achieved to the advantage of the process in question.

EXAMPLE OF GENERAL OPERATION

In FIGURE 6, a complete plant is shown which includes a first tower 80 having built therein a three cell (I, II, and III) freezer 20, arranged in parallel with a multiple spray condenser 81 superimposed thereon; a second tower 82, housing the ice separator or decanter 24 (FIGURES 3, 3-A and 3-B); a third tower 84, housing the heat exchanger 25 (FIGURE 5); and a fourth tower 85 housing an auxiliary spray condenser 86.

Thus, in the flow sheet diagram, FIG. 6, showing one possible arrangement of the system, there may be considered the unit for producing approximately 250,000 gallons per day, or approximately 10,000 gallons per hour of fresh water from sea water, which is to be concentrated about 2 for 1, i.e., from about 3,500 parts per million of total solids to about 7,000 parts per million of total solids. The fresh water produced will have a total solids content of approximately 350 parts per million.

The sea water enters the system at about 15° C. in an amount of 20,000 gallons per hour. It passes through the heat exchangers, 66, 67 and 68 to be chilled to about 3° C. and then passes to the freezer, maintained at about —3° C. at the inlet and about —5° C. at the outlet. The freezer 20 is in the lower part of a vertical tank 87 20 feet in diameter. There are three chambers I, II and III so that it actually operates as three units in parallel, each 6 feet high. Sparger coils 88 supplying liquid butane for the refrigeration and agitation of the crystallizing brine are on the bottom of each freezer compartment to work with the entire depth of about 5 feet of brine. The necessary baffles (FIGURE 2-A) are inserted to make a series of cells, although these are not indicated in this flow sheet.

There is withdrawn a slurry of ice crystals in brine at 89. The ice crystals are in sizes from about 0.04 to 0.08 mm. and are carried by the brine to the extent of about 12 times the weight of the ice. This large amount of brine makes pumping easy, also it enables a substantial motion of liquid to be maintained from right to left in the freezer.

This brine-ice slurry goes to the lower section of the ice decanter 24, a vessel 15 feet in diameter by 20 feet high. In this, the ice rises to the surface and is now picked up by the jet action of a spray of water at 0° C. of about 10 times the weight of the ice, and this forms an ice-fresh water slurry which is passed to the spray condenser.

Wash water to the extent of a very few percent of the weight of the ice passes downwardly through the ice mass to wash it free of brine. The brine, freed of crystals of ice, and diluted very slightly by the very small amount of wash water which now is mixed with it, passes back to the freezer.

The vapors from the several freezer trays are combined in parallel to the suction of a main compressor 21 having a compression ratio about 1.25 connected to a 200 H.P. motor, and discharging vapors into the spray condenser 81, which is a section 10 feet high by 20 feet in diameter, superimposed directly upon the freezer section 20 of its tower. The vapors in compression, along the saturation curve for butane, have the temperature also increased sufficiently, above the freezing point of water, i.e., 3 to 5° C. to melt ice.

The ice-fresh water slurry is pumped to seven spray nozzles 80 which are located at the corners and center of a hexagonal pattern of the condenser 81. The sprays therefrom "fill" the volume almost completely, so that the vapors entering on one end of a diameter and leaving at the other end must be completely contacted with the spray of ice-water slurry.

The lower part of the condenser section, below the sprays for the ice-fresh water slurry, is a separator 81 for the butane condensate and the fresh water. The butane returns to the freezer sections I, II and III, and the fresh water goes partly back to make new ice-fresh water slurry and partly to the heat exchanger 25 and then out as product.

Suitable internal posts (not shown) carry the weight of the liquid in the condenser and the freezer sections down to the floor of the vessel.

The heat exchangers for recovering the refrigerating effect of the cold brine outflow and the cold fresh water outflow, to be used in chilling the inlet sea water, are combined in a single tower with a diameter of 15 feet by 20 feet high; and their operation is as described above.

An auxiliary compressor 21-A with a compression ratio of about 2.0, is connected to a 150 H.P. motor. Here again, a spray condenser 86 is used, with sea water cooling in a chamber of the tower 85 15 feet in diameter and 7 feet high.

The total heat requirements of such an operation depend upon the temperature of the sea water feed, the temperature of the air, hence heat losses; the efficiency of the motor driven equipment, the amount of insulation, and the size of the unit, larger sizes give less area per 1,000 gallons throughput, thus less heat absorbed into the system per unit of product, and somewhat better efficiency of the mechanical equipment. In general, the cost of power may be somewhat less for large capacity units than for this one of modest capacity which has approximately 400 H.P. connected load, and an energy cost of approximately 30 kilowatt hours per 1,000 gallons of fresh water produced.

USE OF ABSORPTION SYSTEM OF REFRIGERATION

In some cases, particularly where sea water is to be desalinated, there is not immediately available the necessary source of mechanical or electrical power; and for such an installation a power station might be required if a compression refrigeration system was to be used. In those cases, and in some other cases, the absorption system of refrigeration may be preferred instead. Furthermore, the absorption system does not require the high cost compressor.

The absorption system is satisfactory for freezing ice to desalinate sea water, as indicated in FIGURE 9, wherein the freezer 20 itself would be operated exactly as with a compression system, as in FIGURE 1. Also, design and operation of the ice-decanter 24 and of the direct contact condenser-ice melter 22 would be the same. Taking the place of the compressor 21 in elevating the pressure of the butane vapor from that of the freezer to that required for melting the ice, there would be required two units: the absorber 92 and the still 94, and one almost essential unit, the heat exchanger 95. The absorber is water-cooled and may be of any preferred type of standard gas absorption equipment. In the present case, the absorber is indicated as a spray deivce, although towers, either packed with filling bodies or of other type of gas-liquid contactor preferably with a low-pressure drop, may be used. Also, the absorber may be a multi-stage unit, with sprays in series, or in parallel to the vapor flow, as will be discussed later.

An absorbent "oil," such as a naphtha fraction, e.g., octane; an aromatic such as toluene or xylene, or a chlorinated hydrocarbon, or other similar liquid, may be used. Usually a boiling point above 100° C. is preferred, and an upper limit may be about 175° C., as indicated above for the liquid to depress the vapor pressure of butane in the cells of the freezer 20, but in some cases a material as low-boiling as benzene (80° C.) may be used. In fact, the same liquid may be used as has been described above for controlling the freezing point depression in the freezer, and indeed it would be desirable to use the same liquid for both purposes in any one system. Here, again, the reduction of the vapor pressure of the butane out of its solution with the oil is the desired effect at any given temperature.

Thus, if n-octane is used, the vapor pressure chart of FIGURE 7 may be extended to a slightly higher temperature range to include the temperature at which the absorber would operate; and this chart would give the controlling factors for this operation. The absorber oil is cooled in the absorber by passing water at its available temperature through suitable cooling coils submerged in a bulk phase of the oil below the spray head, or heads. The resulting temperature of the oil in the absorber is thus slightly higher than the cooling water temperature, because of the necessity of a temperature difference. This oil becomes charged with butane in the absorber; and butane is then stripped out of the oil in the still. The stripped oil from the bottom of the still is recycled. A heat exchanger 95 between the feed liquid to the still and the still bottoms is used as in standard practice, in both distillation practice and absorption refrigeration practice. The still, itself, operates under pressure slightly elevated above atmospheric, so that the butane vapor leaving has a temperature sufficiently high to allow condensation by the condenser with the fresh water-ice slurry, as is also practiced in the compression system. Thus, the condenser operates at the same pressure and temperature as in the compression system (e.g., FIGURE 1).

In some other systems previously proposed, the absorber 92 has been cooled by melting the fresh water-ice slurry; and the condenser was cooled by cooling water. This gives a much higher temperature in the condenser 22 and much less efficient utilization of the refrigeration effect of the absorption process.

The auxiliary equipment following the condenser 22 has the same functions as that previously described under the compressor system; but is not shown in FIGURE 9. In the usual case, it would also be another absorption system connected in the same way as the main units; but it might, instead, be a compression system depending on the overall balance and cost of power and of thermal energy available.

Here, again, the heat exchanger may be a liquid-liquid-liquid type, or the new method for cooling a volatile liquid (in this case, sea water at ambient temperature) is described in the aforementioned U.S. Patent Application 241,721. Alternately, as always, it may be a simple tube-and-shell heat exchanger, depending on conditions in the particular plant, and the necessity for simplicity in a small plant.

FIGURE 10 is a more complete flow sheet of an absorption system, as described in the co-pending application. A multi-stage evaporator-freezer 96 operates at successively lower pressures and is connected directly into a multi-stage main absorber 97. Each stage may consist of a single cell or several cells of FIGURE 2 above. Also, FIGURE 10 shows the cold-exchanger 98 to cool the entering sea water in warming the cold streams of brine and of fresh water discharging. The main exchanger 99 and the oil cooler 100 are also described in that application. The auxiliary equipment necessary because of inefficiencies, heat losses, etc. are shown in FIGURE 10 as comparable, respectively, to the main absorber 97, the main still 101, the main heat exchanger 99, and the main condenser 102.

ABSORPTION SYSTEM UTILIZING NEW METHOD OF COOLING A VOLATILE LIQUID

Co-pending U.S. patent application 241,721, of December 3, 1962, deescribes the use of an absorption system of refrigeration which utilizes an evaporator having several stages, in cooling the volatile liquid (in this case butane) by evaporation. An absorber section of each of the several stages absorbs the butane. Each stage has the same pressure in the evaporator side and the absorber side.

Various systems are described in the co-pending application for supplying heat to vaporize the volatile liquid, butane, used therein as a refrigerant. In the present case, there is utilized the latent heat of freezing of the water to supply heat to vaporize the butane as is the subject of the present invention, the de-watering of aqueous solutions, e.g., freezing ice from sea water.

By operation at successively lower pressures as in the multi-stage evaporator system, the boiling temperature of the butane will go down. Respectively lower boiling points may correspond to the respectively higher concentrations of solution; and by proper control, the temperature differential between the boiling butane and the equilibrium freezing point of the salt solution can be adjusted to give the larger driving force for heat transfer, and hence crystallization in the part of the series of stages where the increased surface area of the crystals will allow a greater weight of crystallization without the formation of new nuclei.

As outlined above, a vapor pressure depressant liquid may also be used to obtain this same effect. In this embodiment of the method of formation of ice crystals, the control of the vapor pressure is not by addition of a liquid to depress the vapor pressure of the butane, but instead by operation of the several stages at successively lower controlled pressures, and thus with the control of corresponding boiling points, temperature differences, and rates of crystallization. It goes without saying that in any one stage, the freezer may also be operated as described above, the successive cells and a vapor pressure depressant liquid controlling the boiling point throughout that stage, as described with FIGURE 2 as an example.

However, the advantages of the multi-stage absorber in its particular function as part of a usual absorption refrigeration system has been well described in the co-pending application, and in connection with the same characteristics of its operation, as therein mentioned.

The auxiliary absorber will usually best be operated at a single pressure, as indicated in FIGURE 10, rather than as a multiple stage unit.

There is also described in the co-pending application a unit having a stream of volatile liquid which is flash evaporating, and being chilled by two streams of colder liquid which are being warmed, one by open condensation, and one by closed condensation. Here, the cold exchanger is one such unit, in that in each of several stages, it countercurrently pre-chills the sea water by flash evaporation, the vapors pass to (a) an open condensation of pure water on the stream of cold fresh water, in sprays or other extended surfaces of liquid water, and (b) a closed condensation on the outside of tubes carrying the chilled brine leaving the ice separator and passing out of the system.

Through the flash evaporation of part of the sea water, an additional amount of the pure condensate is immediately added to the effluent fresh water; and this addition may amount to as much as 10% of the total product made in the system. Even larger amounts of additional product may thus result without added cost if, for some reason, it is desired to operate with a relatively high throughput of raw water compared to the amount of ice produced, with a corresponding lower concentration of brine. This represents a net gain of product which accrues to the system without any cost, as compared to the method of heat interchanging utilized in any other freezing process suggested.

Similarly, the co-pending application has discussed the advantages of flash evaporation and exhaustion or stripping of butane from the absorber oil in the operation of a heat exchanger such as the main exchanger between the still and the absorber. Here, the closed condensate in each stage will include an amount of refrigerant stripped from the absorbing oil as described in the co-pending application. This gives an absorbing oil more nearly free of refrigerant in the absorber without any additional cost in the system, and hence allows a greater efficiency of the refrigeration action and a lower net cost of the product.

I claim:
1. The process for de-watering an aqueous solution which comprises the following steps:
  (a) passing said aqueous solution to a single freezing zone wherein a freezing operation is conducted to produce ice crystals while said aqueous solution is flowing directly through a series of successive contiguous fluid flow connected compartments of said freezing zone at successively lower temperatures, said aqueous solution being fed in parallel flow to said compartments, in each of which compartments a refrigerant liquid being fed in parallel flow which is substantially water insoluble is evaporating at substantially the same pressure, but at successively lower temperatures in the order of flow of said aqueous solution;
  (b) in each compartment of said freezing zone, removing heat from said aqueous solution by the evaporation of said refrigerant liquid, at a temperature which is below the equilibrium freezing temperature of ice crystals and the solution in the said compartment, while said solution becomes more concentrated in the said successive compartments in the order of flow of said aqueous solutions; and
  (c) separating said ice crystals from the most concentrated solution resulting in the last of said compartments at one end of said freezing zone and removing said ice crystals from said zone, and withdrawing the vapors of the evaporated liquid refrigerant from said freezing zone.

2. The process according to claim 1, in which the vapors of the said refrigerant liquid formed during the said freezing of the said aqueous solution are:
  (a) mechanically compressed to a saturation vapor pressure corresponding to a temperature higher than the freezing point of pure water;
  (b) contacted with the said ice crystals while at that pressure, thereby melting the said ice crystals.

3. The process according to claim 2, in which the said ice crystals are melted while in a slurry with substantially pure water at the freezing point, said slurry being sprayed into a vapor space containing said vapors of the said refrigerant liquid.

4. The process according to claim 1, in which the vapors of the said refrigerant liquid formed during the said freezing of the said aqueous solution are:
  (a) absorbed in an absorbent oil;
  (b) in solution in said absorbent oil, passed to a still at a higher pressure;
  (c) separated by said still at a higher pressure from said absorbent oil as vapors at a saturation vapor pressure which is higher than that of the said freezing zone and corresponds to a temperature higher than the freezing point of pure water; and
  (d) contacted with the said ice crystals while at that higher pressure, thereby melting the said ice crystals.

5. The process according to claim 1, in which:
  (a) the said ice crystals are separated from the most concentrated aqueous solution by a continuous decantation in a vessel wherein the mass of said crystals continuously rises above the level of the solution and is continuously cut off at a fixed level by a jet of water at substantially the freezing temperature;

(b) the amount of said water used, the velocity of the jet, and the angle of the jet with the horizontal are controlled to give a slurry containing 1 to 30% of ice in water, as well as a small amount of water entrained in the remaining ice mass; and (c) the said water entrained in the ice mass is allowed to flow downwardly continuously over the surfaces of the rising mass of ice crystals to wash off the coating of more concentrated liquid remaining on the surfaces of said ice crystals.

6. The process according to claim 5, in which the said decantation of ice is done in a circular vessel; the said water is sprayed from a radial jet spray on the axis of said tank, and just above the desired level of the flat conical surface of ice crystals formed by the cutting action of the radial spray of water; and the water and ice slurry so developed is received in a peripheral trough located just below the lower edge of the said flat conical surface of ice crystals and passed out through a discharge port.

7. The process of freezing of ice crystals from an aqueous solution, comprising the following steps:

(a) passing said aqueous solution directly through a single freezing zone comprising a series of successive contiguous compartments, while ice crystals are forming and growing in size, said aqueous solution being fed in parallel flow to said compartments;

(b) evaporating in each of said compartments a refrigerant liquid which is substantially insoluble in water, said refrigerant being fed in parallel flow to said compartments;

(c) controlling this evaporation of refrigerant and freezing of ice crystals in the several compartments of the freezing zone so that both the temperatures of the aqueous solution and the amounts of water in the solution are lower in the order of flow of said aqueous solution through the compartments;

(d) maintaining in a liquid phase solution with said refrigerant liquid in at least some of the said compartments, a second water-insoluble liquid which has a vapor pressure not over about four or five millimeters of mercury in the freezing zones and which depresses the vapor pressure of the said refrigerant liquid, while controlling the amount of said second water-insoluble liquid in said solution with said refrigerant liquid, so that the concentrations of the said second water-insoluble liquid in the several compartments are successively lower in the order of flow of said aqueous solution; and (e) separating and removing at one end of said freezing zone ice crystals from their mixture with the most concentrated aqueous solution withdrawn from that compartment wherein the concentration of the said second water-insoluble liquid, in its solution with the refrigerant, is the lowest and the evaporating temperature of the refrigerant is also the lowest, and withdrawing the vapors of the evaporated liquid refrigerant from said freezing zone.

8. The process according to claim 7, in which the said aqueous solution undergoing freezing is agitated to promote the uniform growth of said ice crystals by the ebullition of the said refrigerant liquid from its mixture with said water-insoluble liquid, which mixture is recycled by drawing off a surface layer of said mixture from the compartment into which the aqueous solution enters, and forcing the said mixture of refrigerant and water-insoluble liquid in finely divided streams into the aqueous solution undergoing freezing, at some distance below the liquid surface.

9. The process according to claim 8, in which the liquid surfaces in the several compartments of the freezing zone are all maintained substantially at the same level by passages for ready liquid flow between the said several compartments.

10. The process according to claim 7, in which:

(a) a mixture of the said water-insoluble liquid and the said refrigerant liquid has a lower density than the said aqueous solution in any compartment, and said mixture is added at a level below the surface of each of said successive compartments of the freezing zone at such a rate that it is not completely evaporated in rising to the surface;

(b) a part of said refrigerant liquid in a mixture with the said second water-insoluble liquid which depresses its vapor pressure is withdrawn from the surface of the compartment which has the highest freezing temperature and to which the said aqueous solution is first added, and the concentration of the said mixture is the highest of said vapor-depressant liquid in any of said compartments;

(c) said mixture is recycled to a level below the surface of the said compartment of highest freezing point and in a smaller amount to the adjacent compartment; whereby (d) a decreasing concentration of said vapor-depressant liquid in said water-insoluble liquid is established throughout the said succession of compartments in the order or flow of the said aqueous solution.

11. The process according to claim 10, in which the said freezing operation is so conducted that substantially all of the said ice crystals originate in the first of the said compartments and grow in size, and substantially not in number, in passing through said succession of compartments.

12. The process of melting the ice crystals formed according to the process of claim 7 after the mechanical separation of said crystals from the more concentrated solution resulting from the said aqueous solution, by the heat of the vapors formed in the evaporation of the said refrigerant liquid, which vapors are:

(a) mechanically compressed from the pressure leaving the freezing zone to a saturation vapor pressure corresponding to a temperature higher than the freezing point of pure water; and (b) contacted with the said ice crystals while at that higher pressure, thereby condensing and melting the said ice crystals.

13. The process according to claim 12, in which the said ice crystals are melted while in a slurry with substantially pure water at the freezing point, said slurry being sprayed into a vapor space containing said vapors of the said water-insoluble liquid.

14. The process of melting the ice crystals formed according to the process of claim 7, after the mechanical separation of said crystals from the more concentrated solution resulting from the said aqueous solution by the heat of the vapors formed in the evaporation of said refrigerant liquid, which vapors are:

(a) absorbed in an absorbent oil;

(b) in solution in said absorbent oil, passed to a still at a higher pressure;

(c) separated by said still at a higher pressure from said absorbent oil as vapors at a saturation vapor pressure which is higher than that of said freezing zone and corresponds to a temperature higher than the freezing point of pure water; and (d) contacted with the said ice crystals while at that higher pressure, thereby condensing and melting the said ice crystals.

15. The process according to claim 7, in which the said separated ice crystals are melted to give cold fresh water, and the said original aqueous solution is prechilled before being passed to said freezing zone by an interchange of heat with the said cold fresh water; said prechilling comprising a cooling of the said original aqueous solution by directly contacting in a countercurrent relation with a colder stream of a third water-insoluble liquid of lower volatility than said refrigerant liquid used as a heat carrier, and a heating of said cold fresh water by countercurrently contacting it with the stream of said third water-insoluble liquid used as a heat carrier, which is recycled and cooled thereby.

16. The process according to claim 15, in which the said third liquid water-insoluble liquid used as a heat carrier is the same liquid in kind as the said second water-insoluble liquid which depresses the vapor pressure of the said refrigerant liquid.

References Cited by the Examiner

UNITED STATES PATENTS

| | | | |
|---|---|---|---|
| 2,759,882 | 10/1956 | Worthen | 202—174 X |
| 2,821,304 | 1/1958 | Zarchin | 62—58 |
| 2,896,419 | 7/1959 | Thompson | 62—58 |
| 3,049,889 | 8/1962 | Carfagno | 62—58 |
| 3,070,969 | 1/1963 | Ashley | 62—58 |
| 3,098,733 | 7/1963 | Rosenstein | 62—58 |
| 3,098,734 | 7/1963 | Svanoe | 62—58 |
| 3,137,555 | 6/1964 | Davis | 62—58 |

FOREIGN PATENTS

| | | |
|---|---|---|
| 217,766 | 10/1958 | Australia. |
| 70,507 | 1/1943 | Norway. |

OTHER REFERENCES

Saline Water Conversion Report for 1959, U.S. Dept. of The Interior, January 1960, page 73.

NORMAN YUDKOFF, *Primary Examiner.*